(12) United States Patent
Patil et al.

(10) Patent No.: US 12,136,061 B2
(45) Date of Patent: Nov. 5, 2024

(54) RETAIL SHELF IMAGE PROCESSING AND INVENTORY TRACKING SYSTEM

(71) Applicant: Target Brands, Inc., Minneapolis, MN (US)

(72) Inventors: Arun Patil, Bengaluru (IN); Prakash Mall, Bengaluru (IN); Snigdha Samal, Bengaluru (IN)

(73) Assignee: Target Brands, Inc., Minneapolis, MN (US)

( * ) Notice: Subject to any disclaimer, the term of this patent is extended or adjusted under 35 U.S.C. 154(b) by 248 days.

(21) Appl. No.: 17/681,470

(22) Filed: Feb. 25, 2022

(65) Prior Publication Data

US 2023/0274226 A1  Aug. 31, 2023

(51) Int. Cl.
*G06Q 10/087* (2023.01)
*G06T 3/4038* (2024.01)
(Continued)

(52) U.S. Cl.
CPC ......... *G06Q 10/087* (2013.01); *G06T 3/4038* (2013.01); *G06T 3/608* (2013.01);
(Continued)

(58) Field of Classification Search
CPC ......... G06Q 10/087; G06T 7/194; G06T 7/70; G06T 3/4038; G06T 3/608; G06T 7/0008; G06T 11/60; G06V 10/25; G06V 10/243; G06V 20/52; G06V 10/751; G06V 30/224; G06V 10/28
See application file for complete search history.

(56) References Cited

U.S. PATENT DOCUMENTS

| 9,042,662 | B2 | 5/2015 | Aerts et al. |
| 9,911,290 | B1 * | 3/2018 | Zalewski ............. G07G 1/0072 |

(Continued)

FOREIGN PATENT DOCUMENTS

WO    2019032307 A1    2/2019

OTHER PUBLICATIONS

Singh, Ankit "The Best Way To Address On-Shelf Availability Issue In Retail", https://blog.paralleldots.com/featured/how-to-address-on-shelf-availability-issue-in-retail/, ParralellDots, Dec. 2, 2019, 8pgs.

(Continued)

*Primary Examiner* — A. Hunter Wilder
*Assistant Examiner* — Joseph M Mutschler
(74) *Attorney, Agent, or Firm* — Merchant & Gould P.C.

(57) ABSTRACT

The disclosed system and method relate to automatically detecting empty spaces on retail store shelves, identifying the missing product(s) and causing the space to be replenished or restocked. For example, stores may use shelf-mounted imaging devices to capture images of shelves across the aisle from the imaging devices. The images captured by the imaging devices may be pre-processed to de-warp, de-skew images and stitch together multiple images in order to retrieve an image that captures a full width of a shelf. The pre-processed images can then be used to detect products on the shelf, identify the detected products. For example, the captured image may be compared against a reference background image using a background modeling algorithm to identify empty spaces and mis-shelved items within the shelf.

18 Claims, 16 Drawing Sheets

(51) Int. Cl.
*G06T 3/608* (2024.01)
*G06T 7/00* (2017.01)
*G06T 7/194* (2017.01)
*G06T 7/70* (2017.01)
*G06T 11/60* (2006.01)
*G06V 10/24* (2022.01)
*G06V 10/25* (2022.01)
*G06V 10/28* (2022.01)
*G06V 10/75* (2022.01)
*G06V 20/52* (2022.01)
*G06V 30/224* (2022.01)

(52) U.S. Cl.
CPC .......... *G06T 7/0008* (2013.01); *G06T 7/194* (2017.01); *G06T 7/70* (2017.01); *G06T 11/60* (2013.01); *G06V 10/243* (2022.01); *G06V 10/25* (2022.01); *G06V 10/28* (2022.01); *G06V 10/751* (2022.01); *G06V 20/52* (2022.01); *G06V 30/224* (2022.01); *G06T 2207/20081* (2013.01); *G06T 2207/30232* (2013.01)

(56) References Cited

U.S. PATENT DOCUMENTS

| | | | |
|---|---|---|---|
| 10,007,964 B1* | 6/2018 | Calhoon | G06V 10/44 |
| 10,044,944 B2 | 8/2018 | Adsumilli et al. | |
| 10,565,548 B2* | 2/2020 | Skaff | G06F 18/24 |
| 11,023,850 B2 | 6/2021 | Fisher et al. | |
| 2015/0201166 A1* | 7/2015 | Glickman | B25H 3/00 |
| | | | 348/159 |
| 2015/0248591 A1* | 9/2015 | Shi | G06T 7/30 |
| | | | 382/195 |
| 2016/0171707 A1* | 6/2016 | Schwartz | G06F 18/22 |
| | | | 382/180 |
| 2017/0178060 A1* | 6/2017 | Schwartz | G06Q 10/087 |
| 2017/0178310 A1* | 6/2017 | Gormish | G06T 7/30 |
| 2018/0260767 A1* | 9/2018 | Findlay | G06Q 10/087 |
| 2018/0322448 A1 | 11/2018 | Nemati et al. | |
| 2019/0034864 A1* | 1/2019 | Skaff | G06Q 10/087 |
| 2020/0005225 A1* | 1/2020 | Chaubard | H04N 23/698 |
| 2020/0402139 A1* | 12/2020 | Higa | G07G 1/14 |
| 2021/0166037 A1* | 6/2021 | Higa | G06T 7/254 |
| 2023/0079388 A1* | 3/2023 | Fisher | G06T 7/246 |
| | | | 382/103 |

OTHER PUBLICATIONS

Singh, Ankit "Image Recognition For Retail Shelf Monitoring", https://blog.paralleldots.com/featured/image-recognition-for-retail-shelf-monitoring/, ParallelDots, Jun. 19, 2020, 8 pgs.

Paralelle Dots, Inc. "Win Shoppers in the Store through Perfect Retail Execution", https://www.karna.ai/retail-shelf-monitoring, 2019, 14pgs.

* cited by examiner

RETAIL SHELF IMAGE PROCESSING AND INVENTORY TRACKING SYSTEM

BACKGROUND

In general, stores display retail products and grocery items on store shelves for customer selection. According to a nationwide survey commissioned by a leading provider of retail and category optimization solutions, nearly 70% of U.S. adults would avoid shopping at a store if they encountered empty shelves. Retailers expend significant resources to ensure that store shelves are well-stocked. For example, retailers may periodically require employees to visually inspect shelves throughout the day and ensure that missing are replenished, or misplaced items are returned. Visual inspections can be labor-intensive, time-consuming and inconsistent.

SUMMARY

Embodiments of the disclosure are directed to monitoring inventory positioned on store shelves, and in some instances, identifying missing and misplaced products within store shelves to enable the efficient restocking of the products.

In a first aspect, a method for identifying a product among a first set of products from a shelf image is disclosed. The method comprises: receiving the shelf image, wherein the shelf image is an image of a shelf that includes the first set of products; receiving a planogram image of the shelf, wherein the planogram image includes a second set of products; computing a visual similarity matrix between the first set of products and the second set of products; generating a transformation matrix that maps the first set of products from the shelf image to the second set of products in the planogram image, wherein values of the transformation matrix are derived from values of the visual similarity matrix; iteratively refining the transformation matrix for a predetermined number of iterations; transforming the planogram image by applying the refined transformation matrix; comparing the transformed planogram image to the shelf image to determine a mapping between the first set of products from the shelf image and the second set of products from the planogram image; determining a shelf location of the product within the shelf image; based on a mapping of the transformed planogram image to the shelf image, identifying a planogram product within the planogram image that is located in a planogram location that corresponds to the shelf location; and determining that the product is the planogram product.

In a second embodiment, a system for identifying a product among a first set of products from a shelf image is disclosed. The system comprises: an imaging device; a computing system comprising: a processor; a memory communicatively connected to the processor which stores program instructions executable by the processor, wherein, when executed the program instructions cause the system to: receive the shelf image from the imaging device, wherein the shelf image is an image of a shelf that includes the first set of products; receive a planogram image of the shelf, wherein the planogram image includes a second set of products; compute a visual similarity matrix between the first set of products and the second set of products; generate a transformation matrix that maps the first set of products from the shelf image to the second set of products in the planogram image, wherein values of the transformation matrix are derived from values of the visual similarity matrix; iteratively refine the transformation matrix for a predetermined number of iterations; transform the planogram image by applying the refined transformation matrix; compare the transformed planogram image to the shelf image to determine a mapping between the first set of products from the shelf image and the second set of products from the planogram image; determine a shelf location of the product within the shelf image; based on a mapping of the transformed planogram image to the shelf image, identify a planogram product within the planogram image that is located in a planogram location that corresponds to the shelf location; and determine that the product is the planogram product.

In a third embodiment, a method for identifying a missing product within a shelf image is disclosed. The method comprises: receiving the shelf image, wherein the shelf image is an image of a shelf that includes a first set of products; receiving a planogram image of the shelf, wherein the planogram image includes a second set of products; computing a visual similarity matrix between the first set of products and the second set of products; generating a transformation matrix that maps the second set of products from the planogram image to the first set of products in the shelf image, wherein values of the transformation matrix are derived from values of the visual similarity matrix; iteratively refining the transformation matrix for a predetermined number of iterations, including, for each iteration: projecting the transformed planogram image into image space using the transformation matrix; computing a distance matrix between the positions of the second set of products from the planogram image and positions the first set of products from the shelf image; computing a total similarity matrix between the first set of products from the shelf image and the second set of products from the planogram image as a weighted sum of the visual similarity matrix and the distance matrix; based on the total similarity matrix, computing one or more optimal matches between each of the first set of products within the shelf image and the second set of products within the planogram image; and using the one or more optimal matches re-estimating the values of the transformation matrix; transforming the planogram image by applying the refined transformation matrix; comparing the transformed planogram image to the shelf image to determine a mapping between the first set of products from the shelf image and the second set of products from the planogram image; determining a shelf location of the missing product within the shelf image; based on a mapping of the transformed planogram image to the shelf image, identifying a planogram product within the planogram image that is located in a planogram location that corresponds to the shelf location; and determining that the missing product is the planogram product.

In a fourth aspect, a method for identifying anomalies within a shelf is disclosed. The method comprises: receiving one or more images of the shelf from one or more imaging devices; generating an item-identifier tagged image from the one or more images, wherein the item-identifier tagged image includes a plurality of shelf products; retrieving a reference background image from a data store; comparing the item-identifier tagged image to the reference background image; based on the comparison, identifying foreground objects within the item-identifier tagged image; determining that the identified foreground objects correspond to anomalies associated with the shelf; and sending an item-identifier tag associated with each of the identified foreground objects to a user electronic computing device as a notification of anomalies within the shelf.

In a fifth aspect, a system for identifying anomalies within a shelf is disclosed. The disclosed system comprises: one or more imaging devices; and a computing system comprising: a processor; a memory communicatively connected to the processor which stores program instructions executable by the processor, wherein, when executed the program instructions cause the system to: receive one or more images of the shelf from one or more imaging devices; generate an item-identifier tagged image from the one or more images, wherein the item-identifier tagged image includes a plurality of shelf products; retrieve a reference background image from a data store; compare the item-identifier tagged image to the reference background image; based on the comparison, identify foreground objects within the item-identifier tagged image; determine that the identified foreground objects correspond to anomalies associated with the shelf, wherein the anomalies include at least one of: a product that is mis-shelved and a shelf product that is out-of-stock; and send an item-identifier tag associated with each of the identified foreground objects to a user electronic computing device as a notification of anomalies within the shelf.

In a sixth aspect, a method for identifying anomalies within a shelf is disclosed. The disclosed method comprises: receiving one or more images of the shelf from one or more imaging devices; stitching together the one or more images to create a single shelf image; detecting a plurality of shelf products within the single shelf image; adding a bounding box that surrounds each of the plurality of shelf products on the single shelf image; identifying each of the plurality of shelf products within the single shelf image; associating an item-identifier tag with each of the plurality of shelf products within the single shelf image; assigning a common pixel value to all pixels within each bounding box associated with each of the plurality of shelf products to create an item-identifier tagged image, wherein the common pixel value for each bounding box corresponds to the item-identifier tag associated with the shelf product enclosed within the bounding box; retrieving a reference background image from a data store, wherein the reference background image includes item-identifier tags corresponding expected products associated with each product location on the shelf; comparing the item-identifier tagged image to the reference background image, including: for each shelf product included within the item-identifier tagged image, determining whether an item-identifier tag corresponding with the shelf product matches an item identifier tag associated with a product from a corresponding location within the reference background image; based on the comparison, identifying foreground objects within the item-identifier tagged image; determining that the identified foreground objects correspond to anomalies associated with the shelf; and sending an item-identifier tag associated with each of the identified foreground objects to a user electronic computing device as a notification of anomalies within the shelf.

BRIEF DESCRIPTION OF DRAWINGS

The following drawings are illustrative of particular embodiments of the present disclosure and therefore do not limit the scope of the present disclosure. The drawings are not to scale and are intended for use in conjunction with the explanations in the following detailed description. Embodiments of the present disclosure will hereinafter be described in conjunction with the appended drawings, wherein like numerals denote like elements.

DETAILED DESCRIPTION

Figure 1:
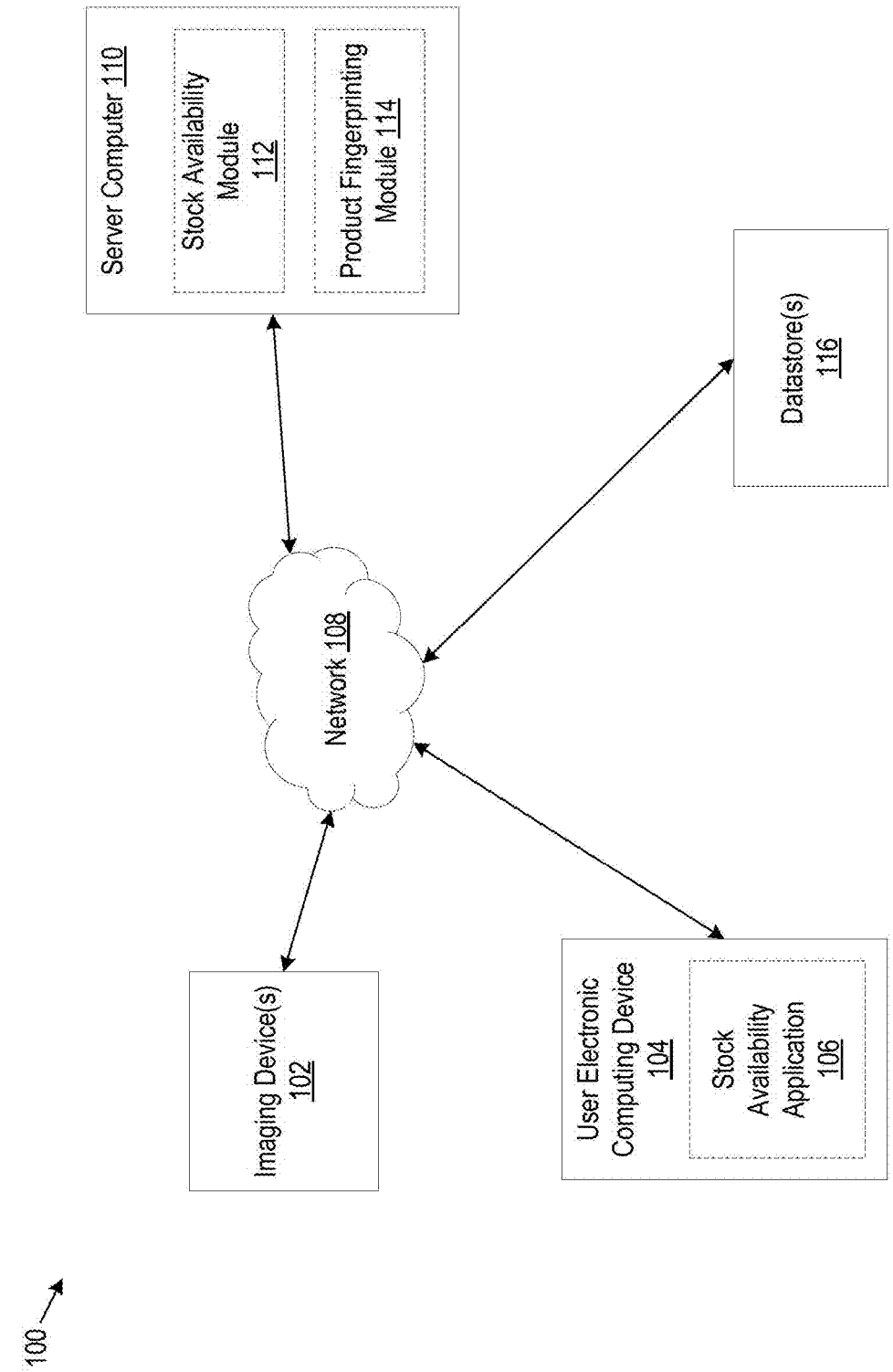
FIG. 1 illustrates an example stock availability system.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

The current process of replenishing empty shelves in stores includes store employees periodically walking through the aisles of the store to identify empty shelf space, identifying the missing products, identifying misplaced items, restocking the missing products and returning the misplaced items to its location. The process may be labor-intensive, inconsistent and time-consuming.

In general, the subject matter of the present disclosure relates to automatically detecting empty spaces on retail store shelves, and identifying the missing product(s), thereby allowing the shelf space to be reorganized, replenished, and/or restocked as necessary. For example, stores may use shelf-mounted imaging devices to capture images of shelves across the aisle from the imaging devices. The images captured by the imaging devices may be pre-processed to de-warp images and stitch together multiple images in order to retrieve an image that captures a full width of a shelf. The pre-processed images can then be used to detect products on the shelf, identify the detected products and when an incorrect product listing or an empty shelf space is encountered, a message may be sent to the store employee to remedy the issue.

In some examples, identifying the detected products includes identifying specific items within images of the shelves. Specifically, object detection algorithms may be used to detect and place bounding boxes around individual products on the shelf image. Pre-existing planogram data and visual features of the detected product image may be used to identify the product detected by the object detection algorithms, for example based on a proximity or location comparison between the location of the object and the expected location of the object in a store planogram.

In some examples, to address the potential challenges inherent in automatically recognizing which facings are missing or output of place from an image of the shelf, a matching process may be employed to match detected products to planogram entries via an iterative projection algorithm.

In some examples, automatically learning a mapping between planogram space and the image space is difficult. An initial mapping between the planogram space and the image space may be inferred and the mapping may be continually refined during an iterative process that is repeated until the mapping between the planogram space and the image space converges. For example, the iterative process may include transforming the planogram facing positions into image spaces, matching the planogram facings to detected items using visual and spatial similarity, and re-computing the transformation map when there is a match between the planogram space and the image space.

FIG. 1 illustrates an example stock availability system 100. In some examples, the stock availability system ensures that store shelves are adequately stocked with products at the correct positions. The stock availability system 100 includes one or more imaging devices 102, a user electronic computing device 104, a network 108, a server computer 110 and one or more datastores 116. In some examples, the server computer 110 may include a stock availability module 112 and a product fingerprinting module 114. More, fewer or different modules can be used.

In some examples, the one or more imaging devices 102 may include one or more imaging devices that may be shelf-mountable and can be used to capture images of the opposite-facing shelf. The one or more imaging devices may be configured to capture high-definition images so that size, color, and textual details associated with the products on the opposite-facing shelf are distinguishable. The one or more imaging devices 102 may include fish-eye lenses in order to capture wide shelf areas. The one or more imaging devices 102 may be battery-powered in order to make installation of the one or more imaging devices 102 on store shelves easier.

The one or more imaging devices 102 may be configured to capture images periodically during the day. For example, the one or more imaging devices 102 may be configured to capture 4-10 images per day in order to preserve battery and extend battery life to 1-2 years. The number of images captured per day and the battery life may be variable. The one or more imaging devices 102 may support network connectivity, whereby the imaging device 102 may connect to the server computer 110 through a wireless network, such as network 108 and transmit the captured images or receive instructions regarding the capture of images or image device settings. Other types of connectivity to the server computer 110 are also possible.

In other examples, the one or more imaging devices 102 may also include high-resolution camera that are used in a studio setting to capture reference images of each or a subset of product that is stocked in the store. The one or more imaging devices 102 may further include one or more vision sensors that are configured within point-of-sale cameras, store employees' handheld devices or other cameras within the store.

In some examples, user electronic computing device 104 is an electronic computing device of the user. For example, the user electronic computing device 104 may receive a voice of text messages from the stock availability module 112 regarding updates on status of stock on store shelf. In other examples, the user electronic computing device 104 may include a stock availability application 106 that receives a notification associated regarding the status of stock on store shelf.

In some examples, the electronic computing device 104 can be a desktop computer, a laptop computer, a mobile electronic computing device such as a smartphone or a tablet computer. The electronic computing device permits the user to access the server computer 110 over a network 108. In some examples, the users of the electronic computing device may include employees of the store that is monitoring the shelves for missing and misplaced products. Although a single user electronic computing device 104 is shown, the example stock availability system 100 may allow hundreds, or more computing devices to connect to the server computer 110.

In some examples, the stock availability application 106 may be a web application or mobile application that can display an updated status of the stock on the store shelf. For example, the stock availability application 106 may include the latest, as well as a historical list of images captured by the imaging device 102 and sent to the stock availability module 112. The stock availability application 106 may also include one or more selections that allow users to make adjustments to the product detection and identification operations performed by the stock availability module 112.

In some examples, the network 108 is a computer network, such as the Internet. The user on user electronic computing device 104 and the imaging device 102 can access the server computer 110 via the network 108.

In an example, the server computer 110 may be a server computer of an enterprise or organization that is a retailer of goods. However, the server computer 110 may include server computers of other types of enterprises as well. Although a single server is shown, in reality, the server computer 110 can be implemented with multiple computing devices, such as a server farm or through cloud computing. Many other configurations are possible. In some examples, the server computer 110 may be located at a central server that is located away from the retailer location. In other examples, the server computer 110 may be located at the retailer location itself.

In one example, the stock availability module 112 receives and processes images of the store shelves and detects and identifies any missing or misplaced items. As discussed in more detail later herein, the stock availability module 112 may analyze the images received from the imaging device 102 to detect the placement of products within the shelf and identify the detected products. Once the products are recognized, the stock availability module 112 identifies and missing or misplaced products within the shelf and determines which product is missing or misplaced. The stock availability module may then send the status of the stock on store shelf to the user electronic computing device 104 in a message or notification that is sent to the stock availability application 106. The stock availability module 112 is described in further detail in relation to FIGS. 2-6.

In some examples, the product fingerprinting module 114 may be used to create a fingerprint for each product that is stocked by the store. For example, as described in relation to FIG. 2 one of the methods by which the stock availability module 112 may identify a missing or misplaced item on the shelf includes using a product fingerprint matching method. The product fingerprinting module 114 may be used to create and store fingerprints for each product carried by the store as a reference. The product fingerprinting module 114 may only be used in creating the reference product fingerprints when the product fingerprint matching method is implemented for the product recognition and identification. The configuration of the product fingerprinting module 114 is described in greater detail in relation to FIGS. 7-8.

The example datastore(s) 116 may include one or more electronic databases that can store one or more data tables that includes data associated with the enterprise. The stock availability module 112 and the product fingerprinting module 114 may store and retrieve data in the datastore(s) 116 via the network 108. The datastore 116 may be maintained by the enterprise or organization itself or be maintained by one or more external, third-parties associated with the enterprise. The datastore 116 can be accessed by the server computer 110 to retrieve relevant data.

Figure 2:
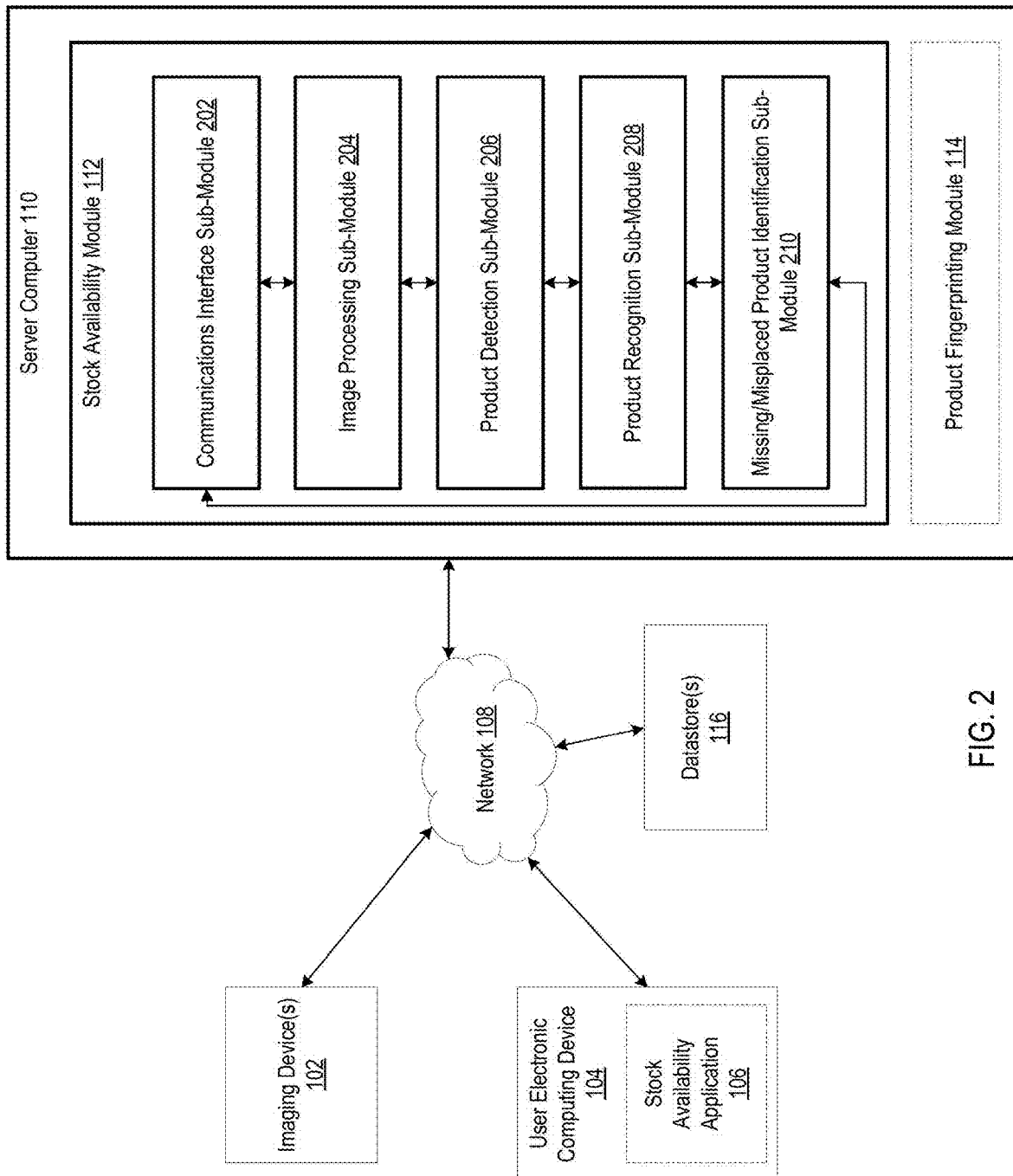
FIG. 2 illustrates an example configuration of the stock availability module.

FIG. 2 illustrates an example configuration of the stock availability module 112. As detailed in relation to FIG. 1, the server computer 110 includes the stock availability module 112, which in turn may be implemented using one or more sub-modules. The one or more sub-modules of the stock availability module 112 may communicate with the datastore 116 through the network 108. For example, the sub-modules of the stock-availability module 112 may transmit data to be stored in the data store 116 and receive data stored in the datastore 116.

In some examples, the disclosed stock availability module 112 may include a communications interface sub-module 202, an image processing sub-module 204, a product detection sub-module 206, a product recognition sub-module and a missing/misplaced product identification sub-module 210. More or fewer sub-modules may be used to implement the stock availability module 112.

In some examples, the communications interface sub-module 202 is configured to receive input data and send output data. In some examples, the communications interface sub-module 202 is configured to receive and send data to the datastore 116 through the network 108. For example, the communications interface sub-module 202 may receive images from the imaging device 102 periodically, at scheduled time intervals throughout the day, via wireless communication between the imaging device 102 and the server computing device 110. Upon receiving the one or more images from the imaging device, the server computer 110 may store the images in the datastore 116.

In some examples, where the server computer 110 is a central server computer that is located away from the retailer location where the imaging devices 102 are located, the received images may be saved in the server computer 110 or the datastore 116 with tags to identify the retailer location, the aisle number, the shelf number, the camera number, date and time associated with the image. The communications interface sub-module 202 of the stock availability module 112 may periodically, at the scheduled time intervals, access the stored images in the server computer 110 or the datastore 116 via communications through the network 108, to retrieve images for further processing of the images using one or more of the other sub-modules of the stock availability module 112.

In other examples, where the server computer 110 is a local server computer that is located at the same retailer location as the location of the imaging devices 102, the received images may be saved in the server computer 110 with tags to identify the aisle number, the shelf number, the camera number, date and time associated with the image. The stored images may be used by other sub-modules of the stock availability module 112 to access the images for further processing The communications interface sub-module 202 may also send out messages, notifications or other types of communication to the user electronic computing device 104. For example, after detecting and identifying missing/misplaced products, as further described in relation to the missing/misplaced product identification sub-module 210, the communications interface sub-module 202 may send one or more text messages, push notifications or other types of communications to the user electronic computing device 104 directly or to the stock availability application 106. The text messages, notifications or other types of communications may include identifying information associated with one or more of: the imaging device, store, aisle, shelf, missing or misplaced product. Other types of information may also be part of the communication from the communications interface sub-module 202.

In some examples, the image processing sub-module 204 is configured to perform image processing on the images received by the communications interface sub-module 202. For example, the images captured by the imaging devices 102 may be warped due to the angle and type of imaging device lens. In addition, due to the length of the shelf, a single image from a single imaging device may not be enough to capture the image of the entire shelf.

Prior to detecting products within the image, or identifying a detected product or empty product space, the images received by the communications interface sub-module from the imaging device 102 is processed to de-warp and stitch together images in order to arrive at a single de-warped image of the full shelf. The processed image may be stored in the server computer 110 or the datastore 116 depending on whether the server computer 110 is local to the retail location or a central server computer. An example of the pre-processed images and the post-processed image produced by the image processing sub-module 204 is described in further detail in relation to FIG. 3.

In some examples, the product detection sub-module 206 is configured to analyze the processed image produced by the image processing sub-module 204 and detect the presence of individual objects within the processed image by identifying the boundaries of the objects. For example, the processed image may be retrieved from the server 110 or datastore 116 and analyzed to detect the presence of individual objects within the processed image. Objects within an image may be detected using an image detection architecture. For example, the Cascade R-CNN is an object detection architecture that works well in recognizing individual products within images of store shelves filled with products. Other types of object detection architectures can also be used in detecting products within the processed images from the image processing sub-module 204. The method of detecting products within a store shelf is described in Rong et al., "A Solution to Product detection in Densely Packed Scenes", 2020.

For example, once the image is analyzed and individual products within the images are detected, the product detection sub-module 206 may draw a bounding box around the boundaries of the product. The bounding boxes may help the stock availability module 112 to recognize a group of pixels within the image as belonging to a single product. In other examples, bounding boxes may also be drawn around empty shelf spaces that is meant to be occupied by an object, but does not include any objects. Other ways of identifying individual products within the processed image and empty spaces within the shelf image are also possible.

In some examples, the product recognition sub-module 208 is configured to recognize products within the analyzed image from the product detection sub-module 206. For example, a retail store may include products of varying sizes and shapes. For example, a product in the shelf image can vary from a sizeable object such as a box of diapers to a tiny beauty product like eye lashes. The product recognition sub-module 208 is configured to automatically and accurately predict a product in a given image while accommodating new products over time.

Although the present disclosure focuses on product recognition within a controlled environment, such as store shelf, and is used for monitoring the shelves for out of stock detection the product recognition sub-module 208 may be used for other purposes such as monitoring planogram compliance, detecting theft at point of sale or checkout, improving visual search in a digital space, and frictionless checkout among other uses.

In some examples, the analyzed image from the product detection sub-module 206 includes bounding boxes around each individual object that has been detected within the image. The product recognition sub-module 208 analyzes the image to identify the product that is associated with each of the bounding boxes.

For example, identifying an object can include recognizing the object as being associated with a particular product within the inventory of products carried by the store. There may be a plurality of methods for identifying an object. For example, the present disclosure describes at least two different solutions of identifying products from the shelf image. A first solution includes using an iterative projections algorithm to simultaneously map planogram data to the shelf image and to detect and identify individual products within the image. The iterative projections algorithm method is described in greater detail in relation to FIG. 5.

An alternate solution includes using a product fingerprint matching method to detect a product within the image. The product fingerprint matching method can detect products without the need to map the product to a planogram. The product fingerprint matching method operates independently of the planogram. Thus, the product fingerprint matching solution scalable and is not dependent on a planogram, which can be stale or not up to date. The product fingerprinting matching method is described in greater detail in relation to FIGS. 7 and 8.

In an example, the missing/misplaced product identification sub-module 210 is configured to detect empty shelf space that is missing a product or shelf space that includes a product in a spot other than where the product is supposed to be stocked. In other words, the missing/misplaced product identification sub-module 210 identifies empty facings and misplaced products within the shelf image. For example, the missing/misplaced product identification sub-module 210 may receive the processed image from the product-recognition sub-module and identify whether a bounding box within the image is empty or contains an object that does not correlate to the planogram. As a result, the missing/misplaced product identification sub-module 210 may tag the bounding boxes or positions within the image that requires further action.

For example, one method by which the missing/misplaced product identification sub-module 210 identifies an empty space is by identifying that the iterative projection algorithm or the product fingerprint matching method, whichever technique is used for the product recognition, did not yield a match. In such cases, the missing/misplaced product identification sub-module 210 may verify that the space is indeed empty by comparing the current image with historical images of the shelf over time. Machine learning algorithms may also be trained to recognize empty shelf space over time.

In some examples, where the iterative projection algorithm is used in recognizing products, once a shelf space is determined to be empty, the product that is supposed to occupy the space is identified using a planogram image. For example, the planogram image may be a visual representation of a retailer's products on display, including a mapping of products stocked by the store to specific positions within the retailer store, including the specific aisle, shelf and position within that shelf where the product may be displayed. The planogram associated with a particular retail location may be determined by the retailer in advance. The planogram image may be created and stored in the datastore 116 or the server computer 110. The missing/misplaced product identification sub-module 210 may retrieve the planogram image from the datastore 116 or the server computer 110 to determine which product corresponds to the empty shelf space identified by the missing/misplaced product identification sub-module 210. For example, the product on the planogram image that is associated with the space corresponding to the empty space on the shelf image is identified to be the product that is out of stock on the shelf.

In other examples, where the product fingerprint matching method is used in recognizing products, once a shelf space is determined to be empty, historical images of the shelf is analyzed to determine the product that is supposed to occupy the space. For example, the missing/misplaced product identification sub-module 210 may retrieve historical images associated with the shelf and acquired within a specific time interval, such as within the last day or last three days or last week, from the datastore 116 or server computer 110 to analyze the previous images, and determine the fingerprint of the product occupying the space that is currently empty. After acquiring a fingerprint of the product, product recognition techniques using the product fingerprint matching method, as described further in relation to FIGS. 7 and 8 may be used to determine the identity of the missing product. The missing/misplaced product identification sub-module 210 may use other techniques to identify missing products as well.

In addition to determining missing products, the missing/misplaced product identification sub-module 210 may also analyzes each of the products recognized by the product recognition sub-module 208 in order to determine whether each of the products within the shelf image are in fact positioned correctly or whether the product is misplaced. For example, the missing/misplaced product identification sub-module 210 may verify that each of the recognize products are occupying the correct shelf space by comparing the recognized products with a reference listing of products on the planogram image.

When the missing/misplaced product identification sub-module 210 identifies a missing or misplaced product, the missing/misplaced product identification sub-module sends a notification to the communications interface sub-module 202 to alert the user electronic computing device 104 that an empty space has been detected. In some examples, the missing/misplaced product identification sub-module 210 may interface with the product recognition sub-module 208 to retrieve and send the communication interface sub-module 202 identifying information associated with one or more of: the imaging device, store, aisle, shelf, missing product.

Similarly, when the missing/misplaced product identification sub-module 210 identifies a product in a particular position within the image that does not match the product that is associated with the position on the planogram, the missing/misplaced product identification sub-module 210 may interface with the product recognition sub-module 208 to retrieve and send the communication interface sub-module 202 identifying information associated with one or more of: the imaging device, store, aisle, shelf, misplaced product and the correct product.

In some examples, as described above, the stock availability module 112 may store data associated with the stock availability module in one or more datastore, including the datastore 115. For example, the data from the stock availability module 112 may be stored in a database format.

In some examples, the data that is stored in the datastore 116 may include: a store identifier that identifies the store, a camera identifier that identifies the camera, date and time when an image is captured, a planogram identifier associated with the shelf on which the camera is focused on, the department identifier identifying the department associated with the store shelf, such as the toy department or shoe department, a status based on an analysis of the shelf image, an images from a left imaging device that captures the left portion of a shelf and an image from a right imaging device that captures the right portion of the shelf.

For example, an example configuration of a database storing data related to the store shelf is illustrated below in Table 1. In other examples, more or fewer data associated with the store shelf may be stored in datastore 116. In other examples, the data may be split between multiple datastores that are connected via a network.

TABLE 1

Example Shelf Data

| Store ID | Camera ID | Event Date/Time | Planogram ID | Department | Status | Left Image | Right Image |
|---|---|---|---|---|---|---|---|
| T0206 | 125139 | Dec. 14, 2021 16:45 | A2048PE | Diapers | Processed | Left 1_image.jpeg | Right1_image.jpeg |
| T0693 | 125172 | Dec. 14, 2021 16:44 | F212QJJ | Cookie | Anomaly_ Detected | Left 2_image.jpeg | Right2_image.jpeg |
| T1244 | 124106 | Dec. 14, 2021 16:35 | E003X4L | Cereal | Camera Disabled | Left 3_image.jpeg | Right3_image.jpeg |

In some examples, the data that is stored in the datastore 116 may also include: a stitched image that includes a single image that is generated by stitching together the images from the left imaging device and the right imaging device, a detection image that highlights any detected anomalies within the shelf image, list of products detected within the shelf image, list of products that are identified as missing within the shelf image and list of products that are identified as including a misplaced or mis-shelved item within the shelf image.

For example, an example configuration of a database storing additional data related to the store shelf is illustrated below in Table 2. In some examples, more or fewer data associated with the store shelf may be stored in datastore 116. In other examples, the data may be split between multiple datastores that are connected via a network.

TABLE 2

Example of Additional Shelf Data

| Stitched Image | Detection Image | List of Top Products | List of Empty Products | List of misplaced or mis-shelved items | Number of anomalies |
|---|---|---|---|---|---|
| Stitched_image1.jpeg | Detection_Image1.jpeg | Diapers Giant Pack Size 4 - 148 ct - up & up; Diapers Giant Pack - Size 5 - 128 ct- up & up | Luvs Pro Level Leak Protection Diapers Giant Pack | null | 1 |
| Stitched_image2.jpeg | Detection_Image2.jpeg | Tate's Bake Shop Chocolate Chip Cookies - 7 oz | null | null | 0 |
| Stitched_image3.jpeg | Detection_Image3.jpeg | Frosted Flakes Breakfast Cereal - 24 oz - Kellogg's; | General Mills Family Size Golden Grahams Cereal - 18.9 oz General Mills Family Size Reeses Puffs Cereal - 19.7 oz | null | 1 |

Figure 3:
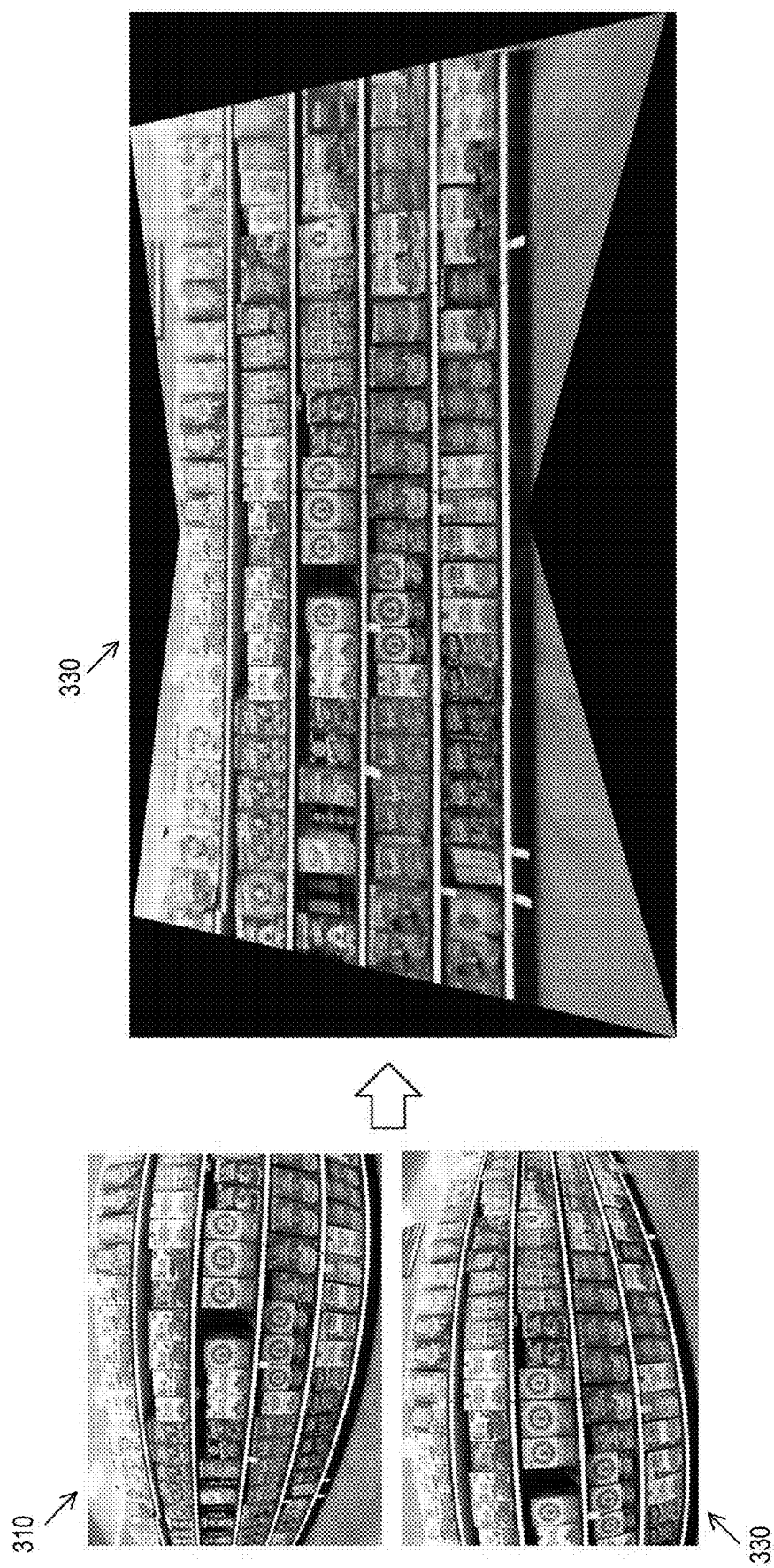
FIG. 3 illustrates an example visual representation of the transformation of a plurality of raw images to a processed image.

FIG. 3 illustrates an example visual representation of the transformation of a plurality of raw images to a processed image.

In some examples, the stock availability system 100 may include a plurality of imaging devices 102. For example, a shelf in a store may include multiple imaging devices to acquire images of different portions of the shelf opposite to the position where the imaging devices are mounted. For example, a first image 310 and a second image 320 may be acquired by a first imaging device and a second imaging device that were mounted at a first location and a second location to acquire images of different portions of a store shelf. The images of different shelf portions can be combined to provide a complete overview of a shelfing unit.

In some examples, dependent upon the angle of the imaging devices 102, the original raw images, first image 310 and second image 320, acquired by imaging devices 102 may be distorted or warped, whereby the images are first processed to de-warp the images and then combine the images to produce a composite image 330.

For example, the composite image 330 may be the result of a de-warping and de-skewing process, as well as a stitching process. For example, individual images captured by imaging devices 102 may be de-skewed to remove perspective effects in an image of the opposed shelf when viewed from the perspective of the imaging device of an imaging device. Specifically, a warping and skewing may occur as to portions of a shelf, and products on those portions, that are further away from and viewed at a less direct angle relative to the imaging device.

Additionally, after the de-warping and de-skewing process, two or more such images may be stitched together to form a composite image 330 of a shelf at a particular point in time. The stitched image may be a composite of the first image 310 and the second image 320 from imaging devices 102. The composite image 330 may then reflect a view of an increased length of an opposed shelf, for example appearing as a panoramic image of the opposed shelf.

The process of acquiring images and processing the acquired image to arrive at a de-warped, de-skewed, stitched composite is described in further detail in IN202111014915, filed on Mar. 31, 2021, and entitled "Shelf Mountable Imaging System", and is hereby incorporated by reference in its entirety.

Figure 4:
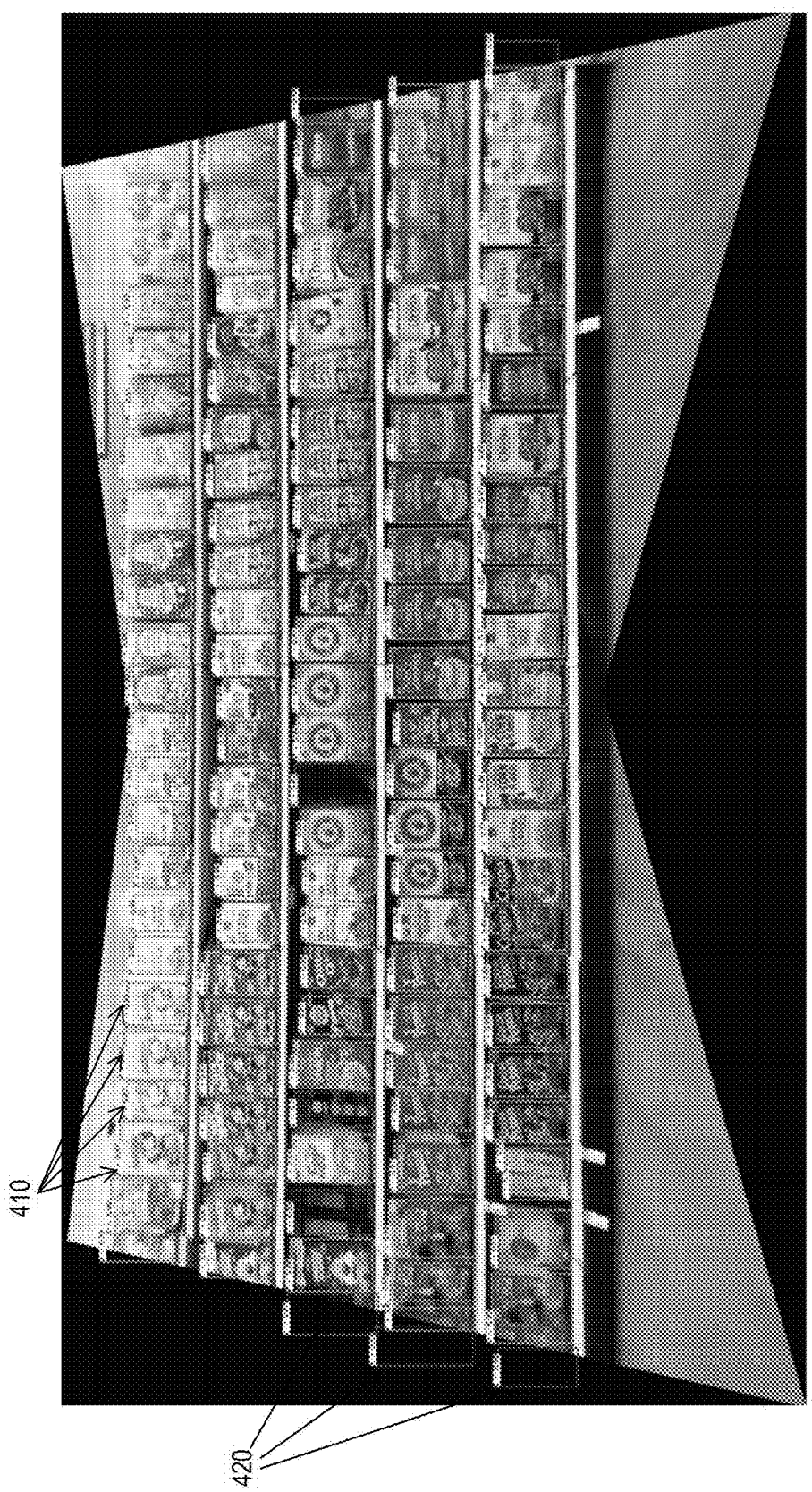
FIG. 4 illustrates an example visual representation of the processed image with bounding boxes enclosing each of the products.

FIG. 4 illustrates an example visual representation of the processed image with bounding boxes enclosing each of the products. For example, after the generation of the composite image 330 in FIG. 3, the stock availability module may be configured to detect individual objects within the processed, composite image 330 and include a visual representation, a bounding box, that encloses the boundaries of the individual objects in order to visually indicate the boundaries of the detected objects.

In some examples, the image detection sub-module 206 of the stock availability module 112 may receive the de-warped, de-skewed and stitched image from the image processing sub-module 204 and analyze the image to detect individual objects within the image. The detection of the objects within the image and addition of bounding boxes 410, 412 to indicate the boundaries of the objects is, as described in FIGS. 2 and 5, done using a Cascade R-CNN algorithm.

In some examples, the Cascade R-CNN algorithm may only detect the boundaries of a product that is located within the composite image 330 and include a bounding box 410 to indicate the boundaries of the detected individual product. In other examples, the Cascade R-CNN algorithm may also detect the boundaries of empty shelf space that indicate the boundaries of an out-of-stock product that is otherwise supposed to occupy the space.

For example, in object detection, there are two main tasks, to solve the recognition problem and to solve the localization problem. The recognition problem includes distinguishing foreground objects from background. The localization problem includes assigning accurate bounding boxes to different objects. Typically, object recognition algorithms detect many "close" false positives, which may make the recognition and localization tasks difficult to accomplish. The multi-stage object detection architecture, Cascade R-CNN, consists of a sequence of detectors trained with increasing intersection over union (IoU) thresholds to be sequentially selective against close false positives. The implementation of the Cascade R-CNN architecture is described in greater detail in Cai, Zhaowei, and Nuno Vasconcelos. "Cascade R-CNN: Delving Into High Quality Object Detection." IEEE Computer Society, *CVPR* 2018: 2018 *IEEE/CVF Conference on Computer Vision and Pattern Recognition: Proceedings:* 18-22 Jun. 2018, Salt Lake City, Utah, 2018, pp. 6154-6162 and Rong, Tianze Rong, et al. *A Solution to Product Detection in Densely Packed Scenes.* 23 Jul. 2020, https://arxiv.org/abs/2007.11946.

Figure 5:
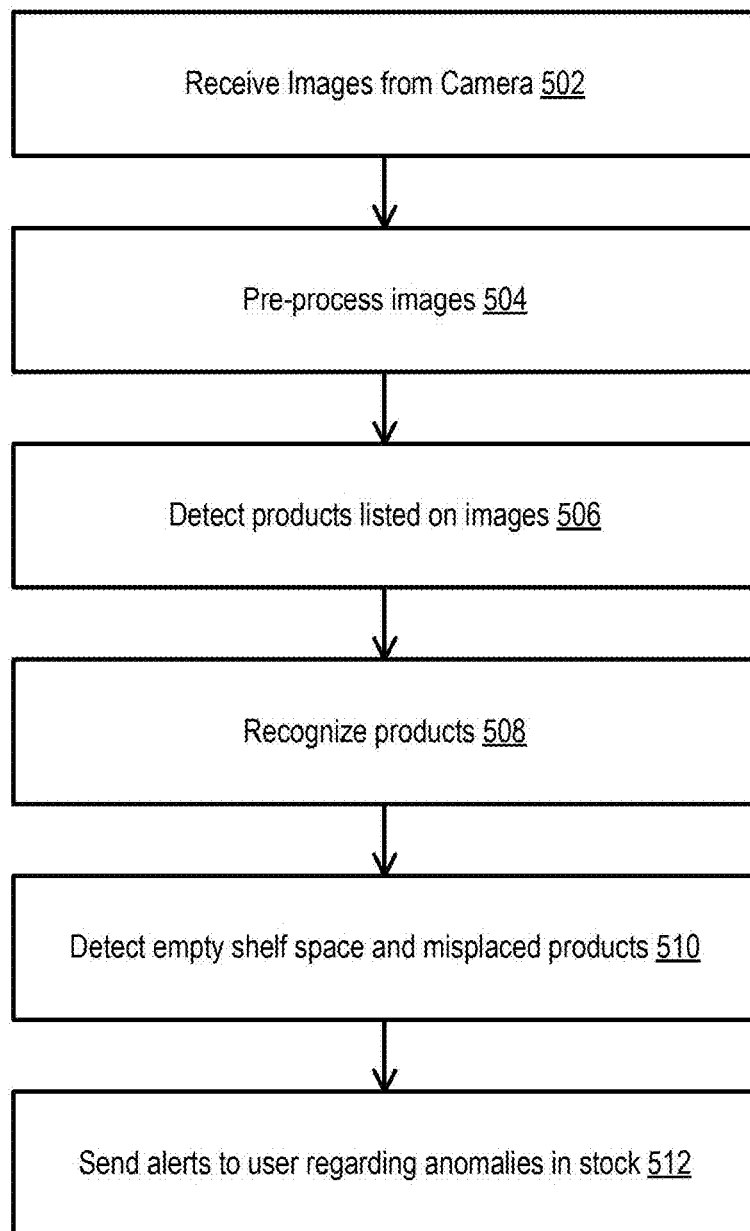
FIG. 5 illustrates an example method of assessing stock availability in a store shelf.

FIG. 5 illustrates an example method 500 of assessing stock availability in a store shelf.

In example operation 502, the communications interface sub-module 202 of the stock availability module 112 may receive one or more images of a store shelf or a portion of a store shelf. The images may be received by the stock availability module 112 via wireless communication directly from the one or more imaging devices 102 or the stock availability module 112 may receive the images following a request by the communications interface sub-module 202 to retrieve the images from the datastore 116 or server computer 110. In some examples, the one or more imaging devices 102 may be wirelessly connected to the server computer 110 and may send, and for the stock availability module 112 to receive the one or more images through wireless communication via the network 108.

In example operation 504, the image processing sub-module 204 of the stock availability module 112 may pre-process the images received in operation 502. For example, the image processing sub-module 204 may de-warp and de-skew the one or more images received in operation 502. In addition, in cases where a plurality of images covering different portions of the shelf are received by the communications interface sub-module 202 in operation 502, the image processing sub-module 204 stitches the plurality of images together to produce a single image that depicts the entire shelf image. Upon completing the de-warping and de-skewing processes, the image processing sub-module 204 may store the processed images in the datastore 116 or server computer 110. The operations of de-warping, de-skewing and stitching together images is further described in relation to FIGS. 2 and 3.

In example operation 506, the product detection sub-module 206 of the stock availability module 112 may detect objects within the composite, pre-processed image produced in operation 504. For example, the product detection sub-module 206 may retrieve the processed image from the datastore 116 or the server computer 110 and the image of the shelf may be analyzed by the product detection sub-module 206 to detect individual products within the image using an object detection algorithm. In some examples, a Cascade R-CNN algorithm may be used in detecting individual objects within the image. In other examples, other object detection algorithms may be used. Once an object is detected within the image, a bounding box may be added to the image to enclose the boundaries of the image. The placement of a bounding box on the image may help the product recognition sub-module 208 to apply product recognition algorithms on pixels enclosed by each bounding box to recognize the product associated with the detected object as described further in operation 508. The detection of objects within the shelf image is described further in relation to FIGS. 2 and 4.

In example operation 508, the product recognition sub-module 208 of the stock availability module 112 may recognize each of the products within the image processed by the product detection sub-module 206 in operation 506. For example, the product recognition sub-module 208 may analyze the shelf image from operation 206 that includes bounding boxes around individual objects to identify the product within the store's inventory that matches the image of each object within a bounding box. One of a plurality of algorithms may be used for recognizing the pixels within a bounding box as associated with a product. In one example, an iterative projections algorithm may be used to detect products within the image. The iterative projections algorithm is described in greater detail in association with FIG. 6. In another example, a product fingerprint matching method can be used to detect products within the image. The product fingerprint matching method is described in greater detail in association with FIG. 7-8. Other product detection algorithms may also be used.

In example operation 510, the missing/misplaced product identification sub-module 210 of the stock availability module 112 may retrieve the processed image from the datastore 116 or server computer 110 and analyze the processed image to identify bounding boxes within the processed image that do not include a product at all or bounding boxes that are identified to include a product that does not match the product that the corresponding location within the shelf is supposed to include. For example, the missing/misplaced product identification sub-module 210 may compare the location of a bounding box to planogram data or to historical data regarding the product occupying the position within the shelf to determine the product associated with that position. For example, the planogram data and/or historical data regarding the products may be stored in the datastore 116 or server computer 110 depending on whether the server computer 110 is a central server computer associated with a plurality of retailer locations or whether the server computer 110 is a local server computer located within the premises of a particular retailer location.

For example, if a location within the shelf includes an empty bounding box, then the missing/misplaced product identification sub-module 210 may access planogram data associated with the particular shelf to identify the product that is mapped to occupy the particular shelf location. Similarly, if the missing/misplaced product identification sub-module 210 identifies a product occupying a particular location within the store shelf as not matching the product that is mapped to occupy the particular shelf location, then the missing/misplaced product identification sub-module 210 identifies the product that is mapped to occupy the particular shelf location.

In another example, instead of using a planogram, the missing/misplaced product identification sub-module 210 may access previously stored image data over a period of time to identify the product that historically occupied the particular location on the shelf. For example, the product detection sub-module 508 may be used to analyze one or more historical images to identify the product that occupies the particular location within the shelf space. The identified product may be presumed as being the correct product associated with the particular location within the shelf.

Upon identifying anomalies within the processed image from operation 508, including empty shelf space and misplace products, the missing/misplaced product identification sub-module 210 may tag the anomalies for the communications interface sub-module 202 to send an message or notification to the user alerting them of the anomaly in operation 512. For example, the missing/misplaced product identification sub-module 210 may identify the location of the empty shelf space or misplaced item and send the identified location information to the communications interface sub-module 202 to send to the user electronic computing device 104.

When an empty shelf space is identified, the missing/misplaced product identification sub-module 210 may also send one or more of the following information to the communications interface sub-module 202 to send to the user electronic computing device 104: an image of the shelf with or without a marker identifying the empty shelf space, the imaging device identifier information, the store identifier information, the aisle identifier information, the shelf identifier information, the name of the missing product, an identifier associated with the missing product, and a stock location associated with the missing product. or misplaced product.

When an empty shelf space is identified, the missing/misplaced product identification sub-module 210 may also send one or more of the following information to the communications interface sub-module 202 to send to the user electronic computing device 104: an image of the shelf with or without a marker identifying the misplaced product, the imaging device identifier information, the store identifier information, the aisle identifier information associated with the current location of the misplaced product, the aisle identifier information associated with the actual location of the misplaced product, the shelf identifier information associated with the current location of the misplaced product, the shelf identifier information associated with the actual location of the misplaced product, the name of the misplaced product, the name of the correct product, an identifier associated with the misplaced product, an identifier associated with the correct product, and a stock location associated with the correct product. Other types of information may also be part of the communication from the communications interface sub-module 202.

In example operation 512, the communications interface sub-module 202 of the stock availability module 112 may receive the data identified by the missing/misplaced product identification sub-module 210 and send communication to the stock availability application 106 in the user electronic computing device 104 or to the user electronic computing device 104 directly with the received data. The communication may be to alert the user associated with the user electronic computing device 104 that a shelf within the store includes an empty shelf space that needs to re-stocked or a misplaced item within the shelf that needs to be returned to its correct position.

For example, the communication may include a text message or image message sent directly to the user electronic computing device 104 through an SMS or email communication. In other examples, the communication may also include sending data to the stock availability application 106 such that a user interface associated with the stock availability application 106 may be updated to display the data sent from the communications interface sub-module 202. Other ways of communication with the user electronic computing device 104 are also possible.

The communication from the communications interface sub-module 202 of the stock availability module 112 may include one or more of the following types of data: an image of the shelf with or without a marker identifying the empty shelf space an image of the shelf with or without a marker identifying the misplaced product, the imaging device identifier information, the store identifier information, the aisle identifier information associated with the current location of the misplaced product, the aisle identifier information associated with the actual location of the misplaced product, the shelf identifier information associated with the current location of the misplaced product, the shelf identifier information associated with the actual location of the misplaced product, the name of the misplaced product, the name of the correct product, the name of the missing product, an identifier associated with the misplaced product, an identifier associated with the correct product, an identifier associated with the missing product, a stock location associated with the correct product and a stock location associated with the missing product. Other types of data are also possible.

Figure 6:
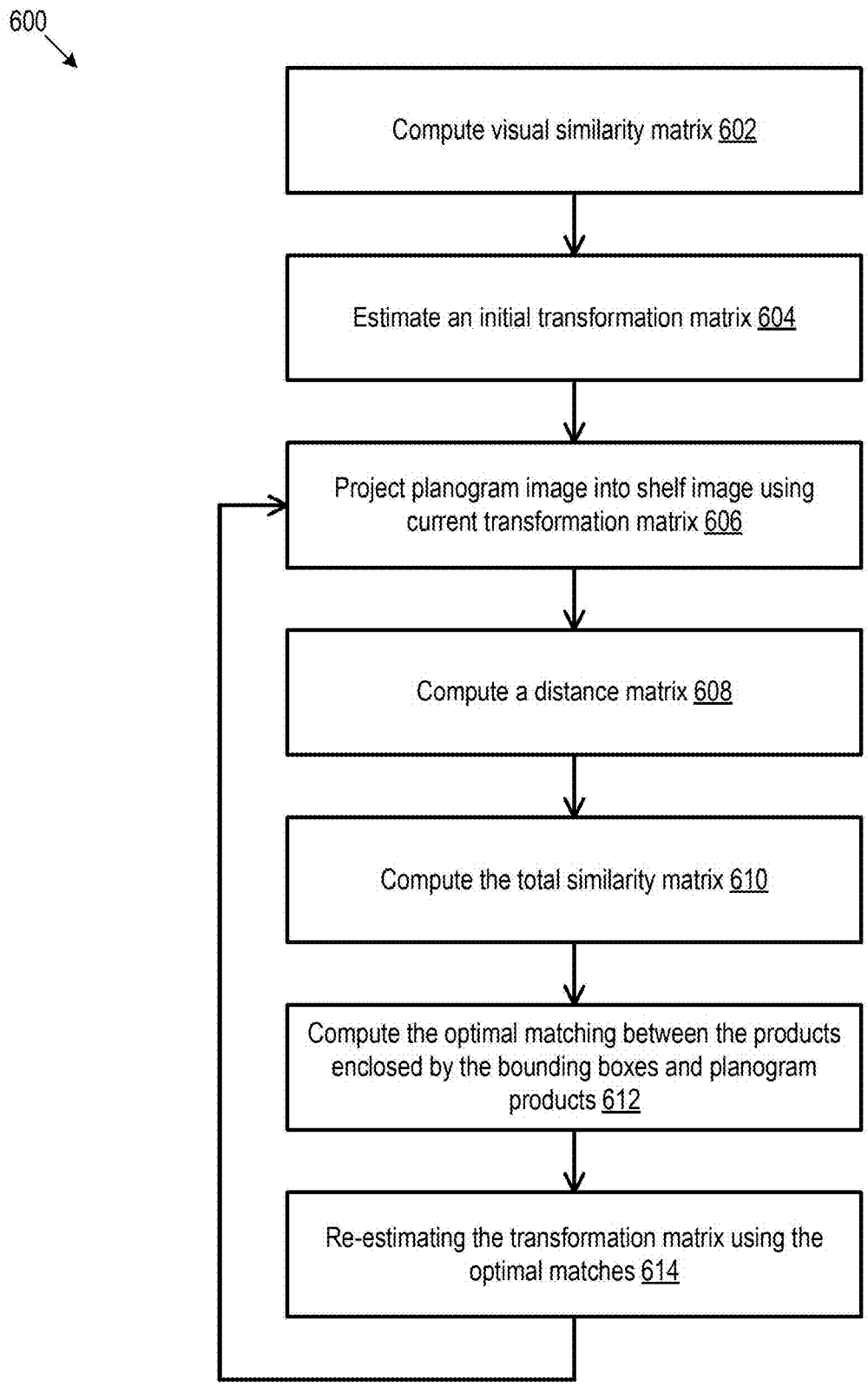
FIG. 6 illustrates an example method of recognizing products within an image.

FIG. 6 illustrates an example method 600 of recognizing products within an image.

Given an image with bounding boxes around individual products on a shelf, recognizing and identifying the product corresponding to each bounding box is difficult. In one example, the product recognition and identification can be done using an iterative projection method using both visual and spatial similarity measure.

In example operation 602, the product recognition sub-module 208 of the stock availability module 112 may compute a visual similarity matrix (VS) between the products that are enclosed by bounding boxes on the shelf image received from the product detection sub-module 206 and images associated with each of the products listed on a planogram of the shelf.

In some examples, the product recognition sub-module 208 may use a feature vector extractor, such as a deep neural network trained with metric learning, to extract features for both the contents of the detected bounding boxes of the shelf image and individual product image regions included in the reference planogram image that includes the products on the shelf as it is supposed to be stocked. For example, a feature vector may be an n-dimensional vector of numerical features that represent the object, in this case, the shelf image including bounding boxes enclosing the detected products on the shelf and the planogram, a reference visual representation of products as they are supposed to be stocked on the shelf.

Upon computing feature vectors of the products enclosed by bounding boxes on the shelf image and the products on the planogram, the product recognition sub-module 208 computes a visual similarity matrix based on the feature vectors. For example, the visual similarity matrix may be a cosine similarity matrix that is used to determine how similar two entities are irrespective of their size. The cosine similarity matrix is the cosine of the angle between the two feature vectors, the feature vector of the products enclosed by bounding boxes on the shelf image, and the feature vector of the products on the planogram. The computed visual similarity matrix may determine the visual similarity between the products enclosed by bounding boxes on the shelf image and the products on the planogram irrespective the size of the images. Other methods of computing the visual similarity matrix are also possible.

In example operation 604, the product recognition sub-module 208 of the stock availability module 112 may estimate an initial transformation matrix.

In some examples, the final mapping between the products enclosed by the bounding boxes in the shelf image and the products on the planogram uses a combination of visual and spatial similarity. The visual component is described in greater detail in operation 602. The spatial component, on the other hand, is difficult to compute. For example, the planogram includes the expected location of each product in real-world space. However, the correspondence of the real-world position of products to pixels in the image (or vice versa) is difficult to estimate.

The transformation matrix is matrix that maps the planogram space (in cm or inches) to the image space (in pixels). The transformation matrix accounts for both visual and spatial similarity. In some examples, the initial transformation matrix may be derived from the visual similarity matrix values.

In some examples, the transformation matrix may be computed if pairs of corresponding position in the two spaces is available. However, barring manual entry, which is not scalable, such data is unavailable. The disclosed solution includes an iterative procedure that alternates between matching bounding boxes to planogram facings with using those matches to compute a new estimate of the transformation matrix. The iterative process minimizes incorrect correspondences between the products enclosed by the bounding boxes in the shelf image and the products on the planogram and is utilized until optimal matching between bounding boxes and planogram products is achieved.

In some examples, the product recognition sub-module 208 is configured to iteratively refine the transformation matrix to include both visual and spatial matrix components. The iterative process of refining the transformation matrix is described below in operations 606-614. Thus, operations 606-614 may be iteratively repeated until an optimal matching between bounding boxes and planogram products is achieved.

In example operation 606, the product recognition sub-module 208 of the stock availability module 112 may project the planogram image into the shelf image using the current transformation matrix.

For example, projecting the planogram product positions into the image space may include transforming the planogram product positions using the current transformation matrix and analyzing the correspondence between the transformed planogram products positions to the positions of the products on the image space. Other ways of projecting the planogram product positions into the image space are also possible.

For example, a current transformation matrix may not be used during the first iteration of operation 606 and the planogram image may be projected into the shelf image without any transformations. However, as operation 606 is repeated during subsequent iterations, the projection of the planogram product positions into the image space may be based on the most recently calculated transformation matrix from operations 610-614, which may include both visual and spatial components.

In example operation 608, the product recognition sub-module 208 of the stock availability module 112 may compute a distance matrix (D) between the between the position of the products enclosed by the bounding boxes on the shelf image and the position of the projected planogram products. For example, a distance matrix is a square matrix containing the distances, taken pairwise, between the elements of a set. There are many methods to compute a distance matrix, including using Euclidean distance calculation methods.

In example operation 610, the product recognition sub-module 208 of the stock availability module 112 may compute the total similarity matrix (S), based on both the visual similarity matrix (VS) from operation 602 and the distance matrix (D) from operation 608. For example, the total similarity matrix may be computed as a weighted sum of the visual similarity and the current distance matrix, wherein the weight of the distance term increases linearly as the algorithm proceeds.

In some examples, the total similarity matrix may be computed using the formula:

$$S=VS-i/N*a*D, \text{ wherein:}$$

S is the total similarity matrix;
VS is the visual similarity matrix;
i is the current iteration of estimating the transformation matrix;
N is the total number of iterations that the transformation matrix will be re-estimated;
a is an external parameter; and
D is the current distance matrix In some examples, i/N, from the formula for computing the total similarity matrix (S), may reflect how close the total similarity matrix (S) is to the optimal matching between products enclosed by the bounding boxes and planogram products. For example, a user of the stock availability system 100 may configure the product recognition sub-module 208 to iterate through operations 606-614 N number of iterations in estimating the transformation. The total number of iterations (N) may be variable but may be pre-set by the user based on the typical number of iterations taken to achieve optimal matching for the type of products on the shelf. As the current iteration (i) increases, the distance between the products enclosed by the bounding boxes and planogram products may be minimized.

In some examples, the external parameter (a) from the formula for computing the total similarity matrix (S), may be variable based on how strong the distance matrix impacts the total similarity matrix. For example, when the total similarity matrix (S) is heavily impacted by the distance matrix (D) more than the visual matrix (VS), the external parameter (a) may be configured to be higher.

In example operation 612, the product recognition sub-module 208 of the stock availability module 112 may compute the optimal matchings between products enclosed by the bounding boxes and the planogram products. For example, applying the total similarity matrix computed in operation 610 to the products enclosed by the bounding boxes in the shelf image may result in similarity matches between the products enclosed by the bounding boxes and the planogram products.

Although ideally, each product from the shelf image is matched to a product on the planogram, in some cases, applying the total similarity matrix may result in multiple products from the shelf image being matched with the same planogram product. In such cases, the product recognition sub-module 208 may assign products from the shelf image to the products from the planogram with a focus on maximizing the number of matches.

In some examples, the assignment of products from the shelf image to the products from the planogram can be done using a Hungarian algorithm. For example, the Hungarian algorithm is a combinatorial optimization algorithm that solves the assignment problem in polynomial time.

For example, in some instances, a robust matching algorithm may be used, in which each item in an image is matched to a most-similar item in the planogram without regard for duplicates. In such an algorithm, each item is the planogram is matched to each item in the image as well, again without regard for duplicates. Once both matching processes are performed, matched pairs are maintained that appear in both sets of matches, representing a cross-validation of the match between planogram images and item images from the shelf image. Other types of algorithms that solve the assignment problem can also be used.

In example operation 614, the product recognition sub-module 208 of the stock availability module 112 may use the identified optimal matchings from operation 612 to estimate or re-estimate the transformation matrix. For example, the identified optimal matchings from operation 612 may be used in a random sample consensus (RANSAC) algorithm to re-estimate the transformation matrix. The RANSAC algorithm is an iterative method to estimate parameters of a mathematical model from a set of observed data that contain outliers.

The re-estimated transformation matrix may be used in the next iteration of operations 606-614, in place of the initial transformation matrix estimated in operation 604. Thus, operations 606-614 may iterate N number of times. At the end of the last iteration, the matching between the products enclosed by the bounding boxes and the planogram products are considered optimized and can be used to detect empty shelf space and misplace products in operation 510, as described in FIG. 5 above. For example, when the method 600 produces no matches for a particular bounding box, the missing/misplaced product identification sub-module 210 may presume that the bounding box encloses an empty shelf space. Other ways of determining that the bounding box encloses an empty shelf space are also possible.

Out-of-Stock Notification Using Product Fingerprinting Algorithm

Figure 7:
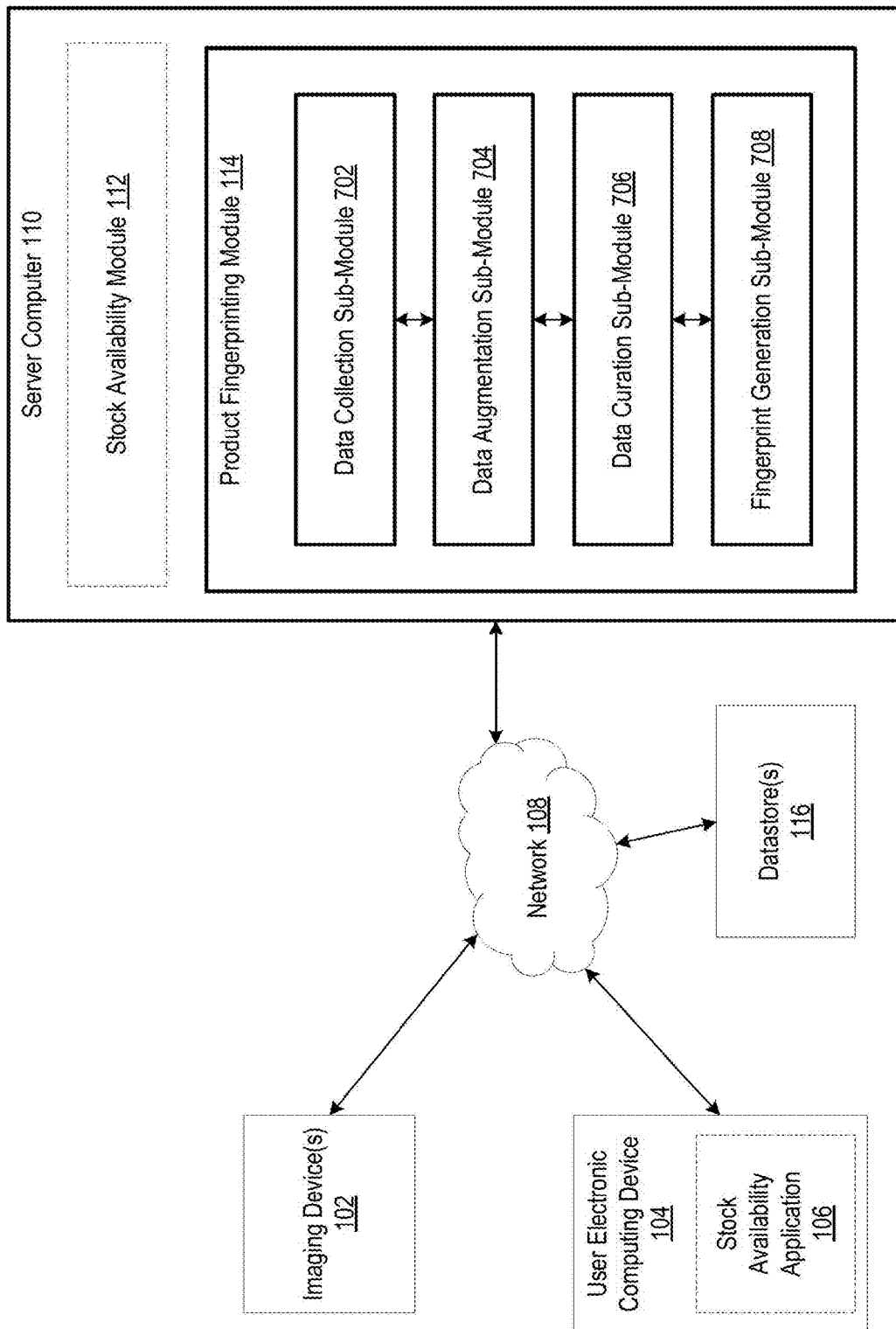
FIG. 7 illustrates an example configuration of the product fingerprinting module.

FIG. 7 illustrates an example configuration of the product fingerprinting module 114. The product fingerprinting module 114 may be used in stock availability system 100 that includes product recognition sub-module 208 that uses the product fingerprint matching method for product recognition. The product fingerprinting module 114 may be used to create and store reference fingerprints for all or a subset of products carried by the store.

In some examples, the product fingerprinting module 114 may include a data collection sub-module 702, a data augmentation sub-module 704, a data curation sub-module 706 and a fingerprint generation sub-module 708. More or fewer sub-modules may be used to implement the product fingerprinting module 114.

In some examples, the data collection sub-module 702 may be configured to receive one or more images associated with a product that is stocked within the store as part of the process of building a training data set. In one example, the data collection sub-module 702 may receive one or more images directly from the one or more imaging devices 102, including imaging devices used in a studio setting, shelf-mounted imaging device and/or vision sensors distributed within the store. In another example, the data collection sub-module 702 may retrieve one or more images associated with a product from the database 116 where the images from the imaging devices 102 may be stored.

In some examples, the data augmentation sub-module 704 may be configured to augment the images received by the data collection sub-module 702 to further increase the overall training dataset that can be developed and stored in the database 116 to help with product detection and identification using the product fingerprinting method. Data augmentation may include generating different datasets from a real data set in order to handle data scarcity or insufficient data diversity. One technique in augmenting the images received by the data collection sub-module 702 includes transforming the two-dimensional images to 3-dimensional image. The transformation may help generate synthetic data of the products, including data for various angles and different scales. For example, for each product carried by the store, multiple datasets, including data sets related to different sizes, different angles, and different lighting, can be generated with the few available images from the data collection sub-module 702 using data augmentations methods. For example, computer vision and deep learning models may be trained to assist with the data augmentation process.

In some examples, the data curation sub-module 706 may be configured to curate the data associated with each product that is carried by the store. For example, the data collection and data augmentation processes executed by the data collection sub-module 702 and data augmentation sub-module 704 produces data, including image data, related to each product in the store. However, the data still needs to be cleaned, labeled, and tagged with a product identifier in order for the data to be easily accessible for downstream data identification and recognition processes.

In some examples, the data curation sub-module 706 may ensure that each image is tagged with a product identifier that ties the image to a product. The data curation sub-module 706 may also ensure that each product carried by the store is tagged with a location within the store, including geographical, aisle and shelf location within the store, a category of product, planogram data and other identifying features associated with the product, such as size, shape, weight, colors, fonts, graphics, brand names. The data curation sub-module 706 may further ensure that the data associated with all the products are stored in a unified format.

In some examples, the fingerprint generation sub-module 708 may generate a fingerprint associated with each product that the store stocks. For example, the fingerprint generation sub-module 708 may process the collected, augmented, curated data from the data curation sub-module 706 using several layers of deep learning algorithms to arrive at the core fingerprint associated with a product. In some examples, the fingerprint algorithm may transform image data associated with a product into a unique vector representation. The fingerprint algorithm may generate the unique vector data based on the image of the product, as well as color, shape, size, text, etc.

The deep learning network may learn the identifiers associated with a product that provide the most success in generating a fingerprint that results in product identification and recognition. For example, the fingerprint generation sub-module 708 may generate a unique fingerprint for each image associated with a product. The product fingerprints may then be stored in a product fingerprint datastore in the datastore 116. In some other examples, the product fingerprints may alternatively or in addition be stored in the server computer 110. The stored fingerprints may be used by the product recognition sub-module 208 in identifying and recognizing a product within an image using the product fingerprint matching method.

The process of building a fingerprint repository that includes a unique fingerprint for each product that is included in the inventory carried by the store is essential for product recognition and identification using the product fingerprint matching method. For example, whenever a store decides to carry a new product, the product fingerprinting module 114 may be used to generate and store a unique fingerprint for a plurality of images associated with the product.

Figure 8:
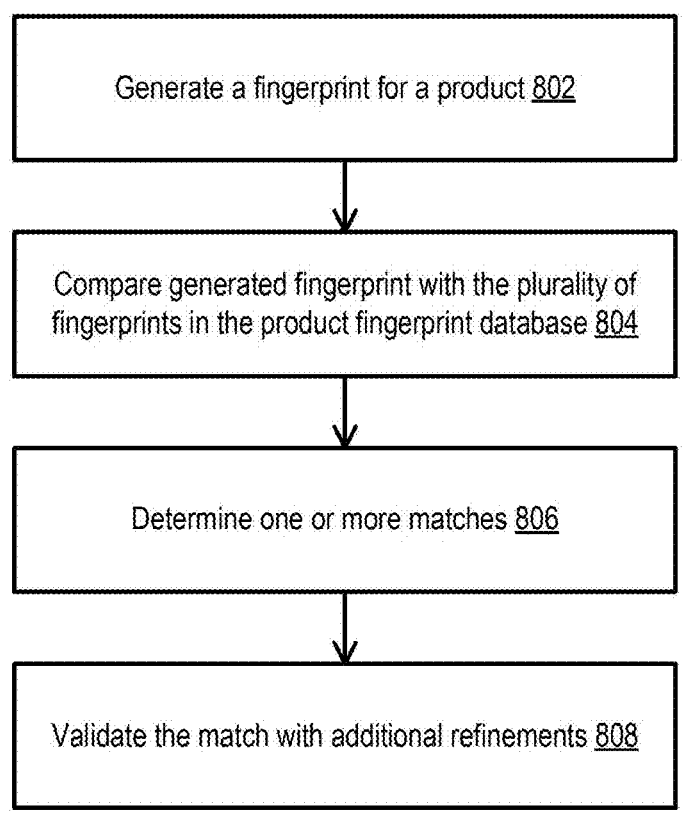
FIG. 8 illustrates an example method of recognizing a product from an image using the product fingerprint matching method.

FIG. 8 illustrates an example method 800 of recognizing a product from an image using the product fingerprint matching method.

In some examples, the product recognition sub-module 208 may receive a processed image of the store shelf, with individual objects within the image detected, from the product detection sub-module 206 as described further in relation to FIGS. 2-4. In example operation 802, the product recognition sub-module 208 may generate a fingerprint for a product within the received processed shelf image.

For example, the product recognition sub-module 208 may use the same fingerprint generation techniques and deep learning network as the fingerprint generation sub-module 708 described in relation to FIG. 7 to generate a fingerprint for a detected product from the processed shelf image.

In example operation 804, the product recognition sub-module 208 may compare the generated fingerprint for the product from operation 802 to the plurality of fingerprints associated with all products stocked by the store and stored in a fingerprint database as described in relation to the fingerprint generation sub-module 708 of FIG. 7. For example, the comparison includes a comparison the vector representation of the product with the vector representations of a plurality of products stored in the fingerprint database.

In example operation 806, the comparison of the product fingerprint to product fingerprints in the database may result in a match percentage, wherein the match percentage is a percentage of the predicted accuracy associated with the match. The product recognition sub-module 208 may identify the store product that is the closest match to the detected product that needs to be identified. For example, the product recognition sub-module 208 may identify one or more store products that have fingerprints that closely match the fingerprint of the product from the processed image that is the subject of the product recognition analysis. The comparison of the product fingerprint to the plurality of stored product fingerprints may yield matches with varying confidence levels.

For example, in case of a 10 oz box Multi-grain Cheerios cereal, the product recognition sub-module 208 may compare a generated fingerprint of the image of the 10 oz box of Multi-grain Cheerios to the database of product fingerprints. Upon completing the comparison process, the product recognition sub-module 208 may determine that several close matches exist, including a 10 oz box of Multi-grain Cheerios, an 18 oz box of Multi-grain Cheerios, a 10 oz box of Honey Nut Cheerios. The product recognition sub-module 208 may return the match results with confidence levels associated with each level. For example, product recognition sub-module 208 may determine that the match associated with the 10 oz box of Multi-grain Cheerios resulted in 92% match, whereas the match associated with the 18 oz box of Multi-grain Cheerios resulted in a 70% match and a match associated with the 10 oz box of Honey Nut Cheerios resulted in a 48% match.

In example operation 808, the product recognition sub-module 208 may receive the one or more potential matches determined in operation 806 and analyze the matches further with additional data in order to arrive a final product identification. For example, the refinement process may utilize additional reference sources including product packaging elements such as the text on the product packaging and color of the product packaging, category of the product, the location of the product, including shelf location, aisle location and geo-location in order to improve the overall accuracy and confidence level associated with the product identification.

In some examples, the product text and color information may be determined based on an analysis of the image itself using any known text recognition or color recognition algorithm. In other examples, the product category and location information may be received from the database 116 based on the imaging device identifier associated with the imaging device that captured the image. For example, data associated with each imaging device 102 may be stored in the database 116, including location of the camera, such as aisle number, shelf number, geo-location, as well the category of products associated that the imaging device covers when capturing images.

The product recognition sub-module 208 may use the additional information in order to analyze the one or more matches from operation 806 to reevaluate the confidence levels associated with the matches and arrive at a final match that is used to identify the product in the detected image from the shelf image.

Upon recognizing and identifying the product using operations 802-808, the missing/misplaced product identification sub-module 210 may proceed with operation 510 as described in relation to FIGS. 2 and 5, including detecting empty shelf space and misplaced products.

Figure 9:
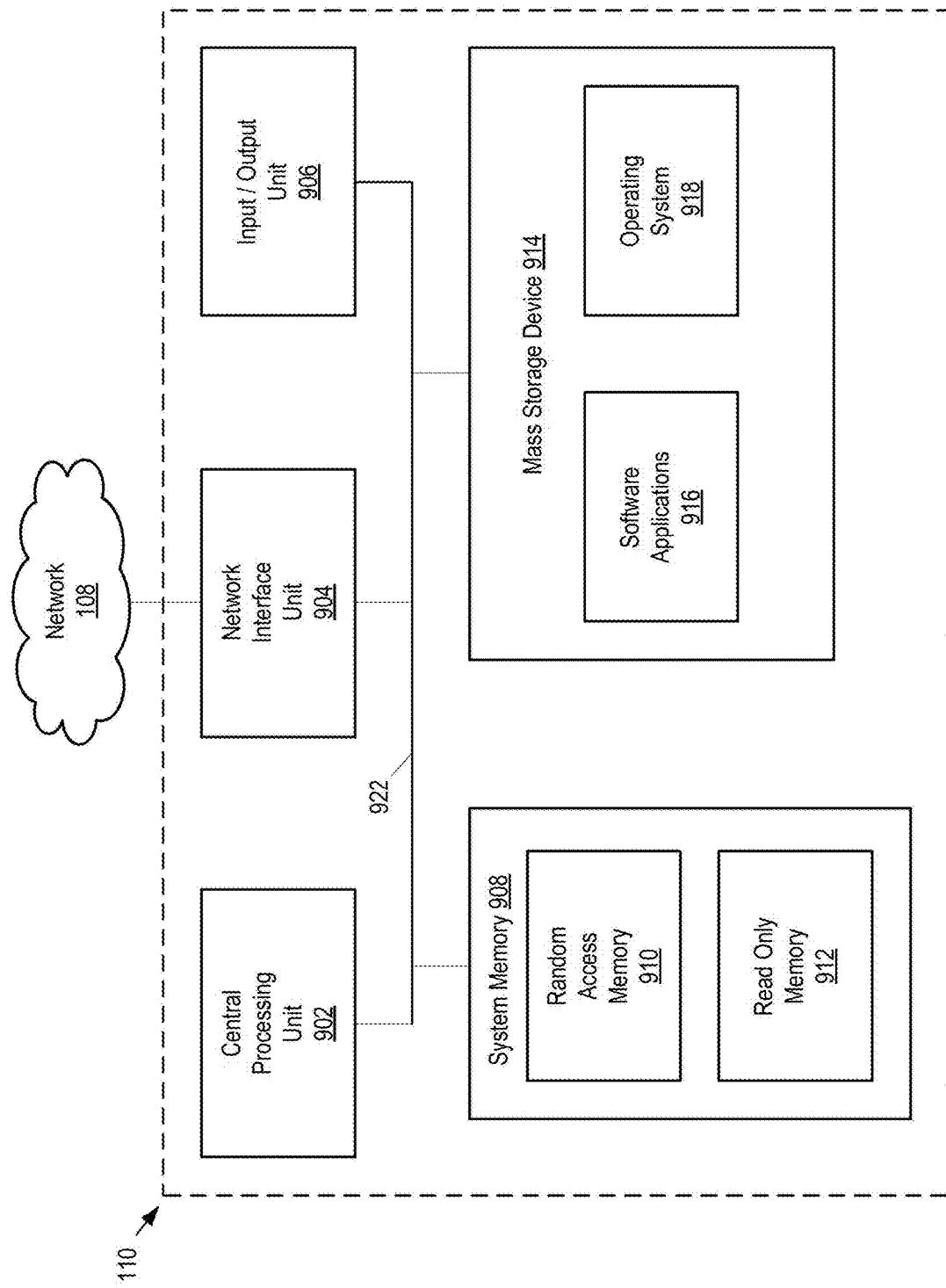
FIG. 9 illustrates example physical components of the computing devices of FIG. 1.

FIG. 9 illustrates example physical components of the computing devices of FIG. 1. As illustrated in the example of FIG. 9, the server computer 110 includes at least one central processing unit ("CPU") 902, a system memory 908, and a system bus 922 that couples the system memory 908 to the CPU 902. The system memory 908 includes a random-access memory ("RAM") 910 and a read-only memory ("ROM") 912. A basic input/output system that contains the basic routines that help to transfer information between elements within the server computer 110, such as during startup, is stored in the ROM 912. The server computer 110 further includes a mass storage device 914. The mass storage device 914 is able to store software instructions and data 916 associated with software applications 916. Some or all of the components of the server computer 110 can also be included in user electronic computing device 104.

The mass storage device 914 is connected to the CPU 902 through a mass storage controller (not shown) connected to the system bus 922. The mass storage device 914 and its associated computer-readable data storage media provide non-volatile, non-transitory storage for the server computer 110. Although the description of computer-readable data storage media contained herein refers to a mass storage device, such as a hard disk or solid state disk, it should be appreciated by those skilled in the art that computer-readable data storage media can be any available non-transitory, physical device or article of manufacture from which the central processing unit can read data and/or instructions.

Computer-readable data storage media include volatile and non-volatile, removable and non-removable media implemented in any method or technology for storage of information such as computer-readable software instructions, data structures, program modules or other data. Example types of computer-readable data storage media include, but are not limited to, RAM, ROM, EPROM, EEPROM, flash memory or other solid state memory technology, CD-ROMs, digital versatile discs ("DVDs"), other optical storage media, magnetic cassettes, magnetic tape, magnetic disk storage or other magnetic storage devices, or any other medium which can be used to store the desired information and which can be accessed by the server computer 110.

According to various embodiments of the invention, the server computer 110 may operate in a networked environment using logical connections to remote network devices through the network 108, such as a wireless network, the Internet, or another type of network. The server computer 110 may connect to the network 108 through a network interface unit 904 connected to the system bus 922. It should be appreciated that the network interface unit 904 may also be utilized to connect to other types of networks and remote computing systems. The server computer 110 also includes an input/output controller 906 for receiving and processing input from a number of other devices, including a touch user interface display screen, or another type of input device. Similarly, the input/output controller 906 may provide output to a touch user interface display screen or other type of output device.

As mentioned briefly above, the mass storage device 914 and the RAM 910 of the server computer 110 can store software instructions and data associated with software applications 916. The software instructions include an operating system 918 suitable for controlling the operation of the server computer 110. The mass storage device 914 and/or the RAM 910 also store software instructions, that when executed by the CPU 902, cause the server computer 110 to provide the functionality of the server computer 110 discussed in this document. For example, the mass storage device 914 and/or the RAM 910 can store software instructions that, when executed by the CPU 902, cause the server computer 110 to display received data on the display screen of the server computer 110.

Background Modeling

FIGS. 1-6 describe an example stock availability system 100 that relates to automatically detecting empty spaces on retail store shelves and identifying the missing product(s), thereby allowing the shelf space to be replenished and restocked as necessary. For example, FIG. 5 illustrates an example method of assessing stock availability in a store shelf that includes receiving images from cameras, pre-processing the images by stitching and de-warping the images to create a composite de-skewed, de-warped image, detecting individual products on the images and enclosing each product with a bounding box, recognizing the product within the bounding box, detecting empty shelf space and misplaced products within the shelf and sending alerts to employee users regarding out of stock items or misplaced items.

As described in greater detail in relation to FIGS. 7-8, one method of detecting an anomaly, such as an empty shelf-space or misplaced product, within the shelf may be done using a product fingerprinting method. Alternatively, a background modeling algorithm may also be used to detect anomalies within a shelf image.

The background modeling algorithm relates to use of a continuously learning model that adapts to a changing environment to distinguish between foreground image components and background image components. For example, the background image components may include generally static components that do not change over time. The foreground image components, which may change over time, may relate to, for example, missing products or wrongly placed products.

For example, a background modeled image would include products that are static over time. Thus, a change in the background image or appearance of a foreground object may correspond to the absence of a product that would otherwise be present in that background image, a misplaced product or a change in a planogram. Accordingly, a detection of a foreground image in an image of a shelf may be indicative of an out of stock event or a change in planogram. Over time, if it is a change in planogram, the new layout may be learned by the background modeling algorithm. If it is an out of stock event, a notification may be sent to in-store personnel at the location from which the captured image is received, and may be addressed by in-store personnel.

Figure 10:
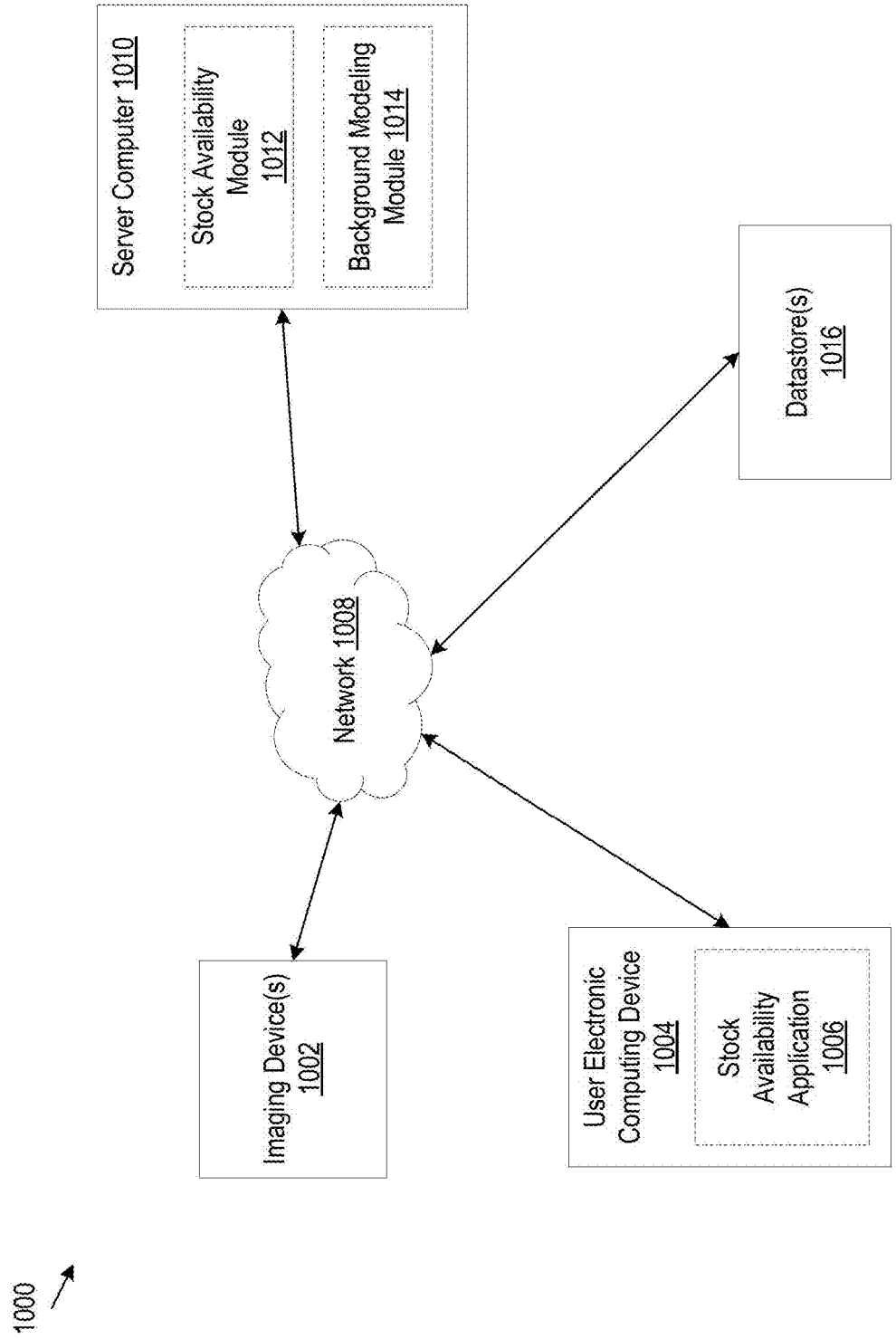
FIG. 10 illustrates another example stock availability system.

FIG. 10 illustrates an example stock availability system 1000. In some examples, the stock availability system ensures that store shelves are adequately stocked with products at the correct positions. The stock availability system 1000 includes one or more imaging devices 1002, a user electronic computing device 1004, a network 1008, a server computer 1010 and one or more datastores 1016. In some examples, the server computer 1010 may include a stock availability module 1012 and a background modeling module 1014. More, fewer or different modules can be used.

The one or more imaging devices 1002, a user electronic computing device 1004, a network 1008, a server computer 1010, the stock availability module 1012 and one or more datastores 1016 may be the same as or similar to the one or more imaging devices 102, a user electronic computing device 104, a network 108, a server computer 110 and one or more datastores 116 of the stock availability system 100, described in greater detail in relation to FIG. 1.

In some examples, the server computer 1010 may include a stock availability module 1012 and a background modeling module 1014. The stock availability module 1012 is the same or similar to the stock availability module 112 described above in relation to FIGS. 1-6 above. For example, the stock availability module 1012 may be configured to receive images from the imaging devices 1002, pre-process the images to de-skew, de-warp and stitch the images from the imaging devices 1002, detect individual products listed on the pre-processed image, adding bounding boxes around each individual product within the pre-processed image.

The background modeling module 1014 may be used to detect abnormalities within the shelf image, including identifying shelf spaces that are out of stock and/or identifying shelf spaces that include a misplaced product. The background modeling module 1014 may detect the abnormalities within the shelf image without relying on a planogram image. An example configuration of the background modeling model 1014 is described in further detail in relation to FIG. 11.

Figure 11:
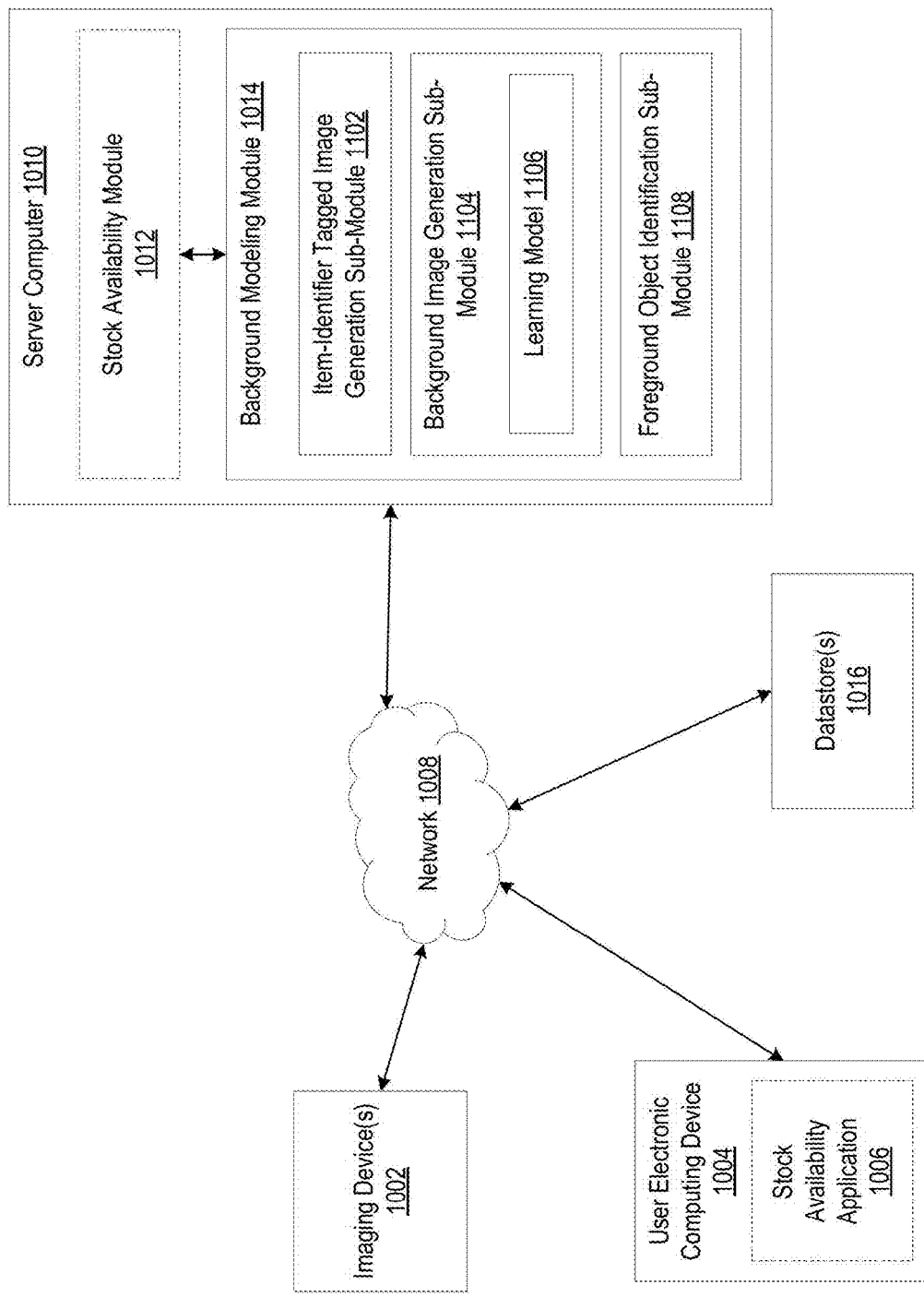
FIG. 11 illustrates an example configuration of the background modeling module.

FIG. 11 illustrates an example configuration of the background modeling module 1014. Background modeling module 1014 is configured to adapt to a changing environment to automatically learn a distinction between background and foreground objects within captured shelf images.

In some examples, the background modeling module 1014 includes an item-identifier tagged image generation sub-module 1102, a background image generation sub-module 1104 and a foreground object identification sub-module 1106. In other examples, more or less number of sub-modules or different types of sub-modules are also possible.

In some examples, the item-identifier tagged image generation sub-module 1102 is configured to retrieve a pre-processed image from the stock availability module from a data store 1016 and create an item-identifier tagged image. For example, an item-identifier tagged image is an image of the shelf that includes bounding boxes enclosing each product within the shelf image where the pixels of the bounding box are set to a bounding box value and the pixels within each of the bounding boxes is set to a common value that identifies the product within the bounding box.

For example, the pre-processed image may be an image of a shelf that has already been processed by the stock availability module 1012. In some examples, the stock availability module 1012 may flatten, de-skew, de-warp and stitch together images from the one or more imaging devices 1002, detect products within the shelf image, add bounding boxes that surround each of the products within the shelf image and identify all or a subset of the products within the bounding boxes to create a pre-processed image. The stock availability module 1012 may then save the pre-processed image in a datastore 1016 or send the images to the item-identifier tagged image generation sub-module 1102 of the background modeling module 1014. The configuration and method of operation of the stock availability module 1012 is described in further detail in relation to operations 502-508 of FIG. 5.

The item-identifier tagged image generation sub-module 1102 may retrieve the pre-processed image and any item identifiers associated with any of the products within the pre-processed image from the data store 1016 or receive it directly from the stock availability module 1012. For examples, the stock availability module 1020 may have already identified some or all of the products enclosed within the bounding boxes on the pre-processed image in operation 508 from FIG. 5. After identifying some or all of the products enclosed within the bounding boxes in the shelf image, the stock availability module 1020 may store the item identifiers associated with each product in the data store 1016 or send the item identifiers associated with each product along with the pre-processed image to the item-identifier tagged image generation sub-module 1102.

In some examples, the item identifier may include a numeric or alphanumeric code, that identifies the product. For example, each inventory item carried by a store may have a unique numeric or alpha-numeric identifier that may be associated with the product. The list of inventory items and corresponding item-identifiers may be stored in datastore 1016. When the stock availability module 1020 identifies a product within the shelf image, the stock availability module 1020 may retrieve the item identifier corresponding to the identified product from the datastore 1016 and tag or otherwise associate the item identifier to the identified product. The item identifier associated with each of the identified products from the shelf image may be stored in datastore 1016. In some examples, the numeric or alphanumeric code may be a commonly used as an identifier of the product across several locations of the store or the item-identifier may be location specific.

Upon receiving the pre-processed image and any associated item identifiers, the item-identifier tagged image generation sub-module 1102 may analyze the pre-processed image to determine whether each product enclosed within a bounding box is associated with an item identifier. Upon determining that some or all of the products within the pre-processed image do not include associated item identifiers, the item-identifier tagged image generation sub-module 1102 may interface with one or more user/human annotation applications to identify products and associate products with item identifiers.

In some examples, the item-identifier tagged image generation sub-module 1102 may interface with a human annotation application in order to determine the item identifier associated with the products within the pre-processed image. The human annotation application may be configured to request assistance from a user in identifying a product within the pre-processed image using a graphical user interface. For example, the graphical user interface may display the pre-processed image and allow the user to manually enter the item identifier associated each of the products enclosed by the bounding boxes within the pre-processed image. Once the item identifier is annotated by the user, the item identifier may be tagged to the identified product and stored in the data store 1016. In some examples, the item identifier tagged image generation submodule 1102 may use a plurality of shelf images for item identification and initialization via user annotation. For example, in some instances, 10 to 20 images may be used for initial item identification and tagging.

In some examples, once the item identifier associated with each of the products within the pre-processed image is acquired and associated with the product using one or more of the following: the product detection operations associated with the stock availability module 1020, and one or more human annotation applications, the item-identifier tagged image generation sub-module 1102, may generate an item-identifier tagged image.

In some examples, the item-identifier tagged image generation sub-module 1102 generates an item-identifier tagged image by altering the pixel value of all pixels enclosed within a bounding box to a common pixel value that corresponds to the item identifier value associated with the product enclosed within the bounding box. In some examples, the common pixel value may be the same as the item identifier value. However, in other examples, the common pixel value may also be derived from the associated item identifier value or correspond to the associated item identifier value. The relationship between the item identifier value and the pixel value may be stored as a map in the datastore 1016.

The item-identifier tagged image generation sub-module 1102 may also alter the pixel values of the pixels associated with each of the bounding boxes in the pre-processed image to a common pixel value to distinguish the bounding boxes from the product itself and to accurately identify individual product or empty shelf spaces. For example, the bounding boxes may be rectangular in shape set and each line may include a width of 2 or 3 pixels. All pixels associated with the bounding box may be set to a common pixel value that is unique such that each individual shelf space is individually distinguishable from an adjacent shelf space.

In some examples, the use of a common pixel value within each bounding box may result in an item-identifier tagged image with minimal noise. For example, algorithms used to identify differences between two images typically do so by making a pixel-by-pixel comparison between two images. However, such a comparison may result in inaccurate results when the images are photographic images of a shelf that may be acquired at different times of the day under different lighting conditions. The item-identifier tagged image that includes common pixel values corresponding to the item identifier associated with the product enclosed within each bounding box may minimize inaccuracies caused during image comparisons by abstracting out the pixel values. Thus, slight movement of the imaging devices and changes in lighting conditions may have no impact or minimal impact during the foreground object identification process described below.

The background image generation sub-module 1104 is configured to generate a background image of the shelf. A background image may be an image of the shelf that includes all the background objects while excluding the foreground objects within the image. Background objects may include all static objects in the shelf image that remain in the same position over time. For example, in a shelf image, the shelving, signs, the products on the shelves that occupy a pre-planned position within the shelf may all be considered background objects. The shelf image may also include foreground objects that are dynamic in nature and may change location over time. For example, any misplaced object or missing shelf space where the back of the shelving unit is visible may be considered foreground objects. The detection of foreground objects is described in greater detail in relation to the foreground object identification sub-module 1108.

The background image generation sub-module 1104 may include a learning model 1106 that may analyze a plurality of item-identifier tagged images to extract out the background object. For example, a plurality of item-identifier tagged images associated with images taken over time of a particular shelf may be used by the learning model 1106 to learn which objects within the images remain static and which objects shift over time.

Using item-identifier tagged images rather than the raw shelf images themselves results in a faster extraction of the background objects since the item-identifier tagged images include relatively minimal noise. Therefore, for shelf with no known prior data, in some cases background objects may be identified by the learning model 1106 and a background image of the shelf may be generated with a smaller number of shelf images than if raw shelf images were used for identifying the background objects. In one example, the background image of a shelf may be generated with as little as 40 images of the shelf.

The learning model 1106 may include a machine learning algorithm that may learn the attributes of the shelving unit, the store background, the type of products stocked in the particular shelf, lighting adjustments and other attributes associated with the particular shelf over time and get faster at distinguishing between background objects and foreground objects. In some examples, the learning model 1106 may utilize a learning rate that may differ between factors. In one example, the learning rate may be set differently based on whether input, trained images are manually labeled or derived from insights from other models. For example, human annotated images may be weighted heavily, while annotations based on product recognition algorithms may receive less weight. Additionally, empty shelf spaces may be weighted less, while shelf space with a product may be weighted more heavily.

After the background objects are identified, the background image generation sub-module 1104 may generate a background image that only includes the background objects. The generated background image may be stored in the datastore 1016. The generated background image is used as a reference image that can be used to detect any changes to the shelf image. The background image may not include any of the foreground objects. The background image may be used by the foreground object identification sub-module 1108 in identifying foreground images and is described in greater detail below.

In some examples, the background image generation sub-module 1104 may be configured to continuously refine the background image periodically by processing newly captured and pre-processed images from the stock availability module 1012 using the learning model 1106. In some examples, the refinement of the background image may be performed ever time a new image is captured by the imaging devices 1002. In other examples, the refinement of the background image may be performed periodically, such as once a day. Any changes to the background image may indicate a change in the planogram. Once a change in the background image is detected by the learning model 1106, the refinement of the background image may be performed by processing every newly captured and pre-processed image such that the refinement of the background image may be completed more quickly. Thus, a change in planogram can be learned by the background modeling module 1014 without any consultation to a planogram image or data.

The foreground object identification sub-module 1108 is configured to identify any foreground objects within a shelf image. For example, a shelf image may include both background objects and foreground objects. As described above, background objects are objects within the image that are static over time and represent products within a shelf that are properly stocked in place. The foreground objects are dynamic and may change over time. In some examples, the foreground objects represent any abnormalities in a shelf image, such as a out-of-stock product or a misplaced or mis-shelved product that is out of place.

In some examples, the foreground object identification sub-module 1108 may receive an item-identifier tagged image from the item-identifier tagged image generation sub-module 1102 or may retrieve the item-identifier tagged image from the datastore 1016. The foreground object identification sub-module 1108 may also retrieve the background image from the datastore 1016.

In some examples, once the item-identifier tagged image and background image are available, the foreground object identification sub-module 1108 may compare the item-identifier tagged image to the background image in order to identify any objects within the item-identifier tagged image that differs from the background image. For example, the pixel value of pixels within a bounding box from the item-identifier tagged image may be compared to the pixel values of the pixels within a corresponding bounding box from the background image.

For example, the bounding boxes within the item-identifier image and the background image can be easily identified because the pixels associated with a bounding box are set to a unique bounding box pixel value by the item-identifier tagged image generation sub-module 1102. Once the bounding boxes of the item-identifier tagged image and the bounding boxes of the background image are identified, the two images may be aligned such that the bounding boxes may overlap and the pixel values within the bounding boxes may be compared to identify any discrepancies. Any discrepancy between the item-identifier tagged and the background image may be identified as a foreground object.

Upon identifying foreground objects within the item-identifier tagged image, the foreground object identification sub-module 1108, the foreground object identification sub-module 1108 may send a notification to the stock availability module 1012 that may include the item-identifier tags associated with each of the identified foreground object. The stock availability module 1012, in operation 512 as described in relation to FIG. 5, receives the notification and sends out an alert to the employee user that anomalies related to the products associated with the received item identifier tags were identified.

In some examples, as described above, the background modeling module 1014 may store data associated with the background modeling module 1014 in one or more data stores including the datastore 1016. For example, one or more data stores including the datastore 1016 may, in addition to the data described in relation to Table 1 above, also store data related to the background modeling module 1014 in a database format.

In some examples, in addition to the data from Table 1 above, the datastore 1016 may include: list of item-identifier tags associated with each of the products from the shelf, item-identifier tag count for products on the shelf, empty product list of item-identifier tags associated with each of the empty shelf items, count of unique shelf product item-identifiers, count of unique empty product item-identifiers, number of product boxes, number of empty boxes, product box percentage and empty box percentage. Other types of data associated with the background modeling module may also be stored in one or more data stores including the datastore 1016. In some examples, the data may be stored in different formats.

For example, an example configuration of a database storing additional data related to the store shelf is illustrated below in Table 3. In other examples, more or fewer data associated with the store shelf may be stored in datastore 1016. In other examples, the data may be split between multiple datastores that are connected via a network.

TABLE 3

Example Additional Shelf Data Related to Background Modeling

| List of item-IDs associated with top shelf products | List of item-IDs associated with empty shelf products | Unique shelf product item-ID count | Unique empty product item-ID count | Number of product boxes | Number of empty boxes | Product % | Empty % |
|---|---|---|---|---|---|---|---|
| 16314054 13379400 | 16870549 54647360 | 12 | 2 | 60 | 10 | 88 | 14 |
| 108549650 | 54696576 89408470 31098085 | 6 | 3 | 72 | 18 | 67 | 33 |
| 56107465 54068481 65879540 | — | 23 | 0 | 184 | 0 | 100 | 0 |

Figure 12:
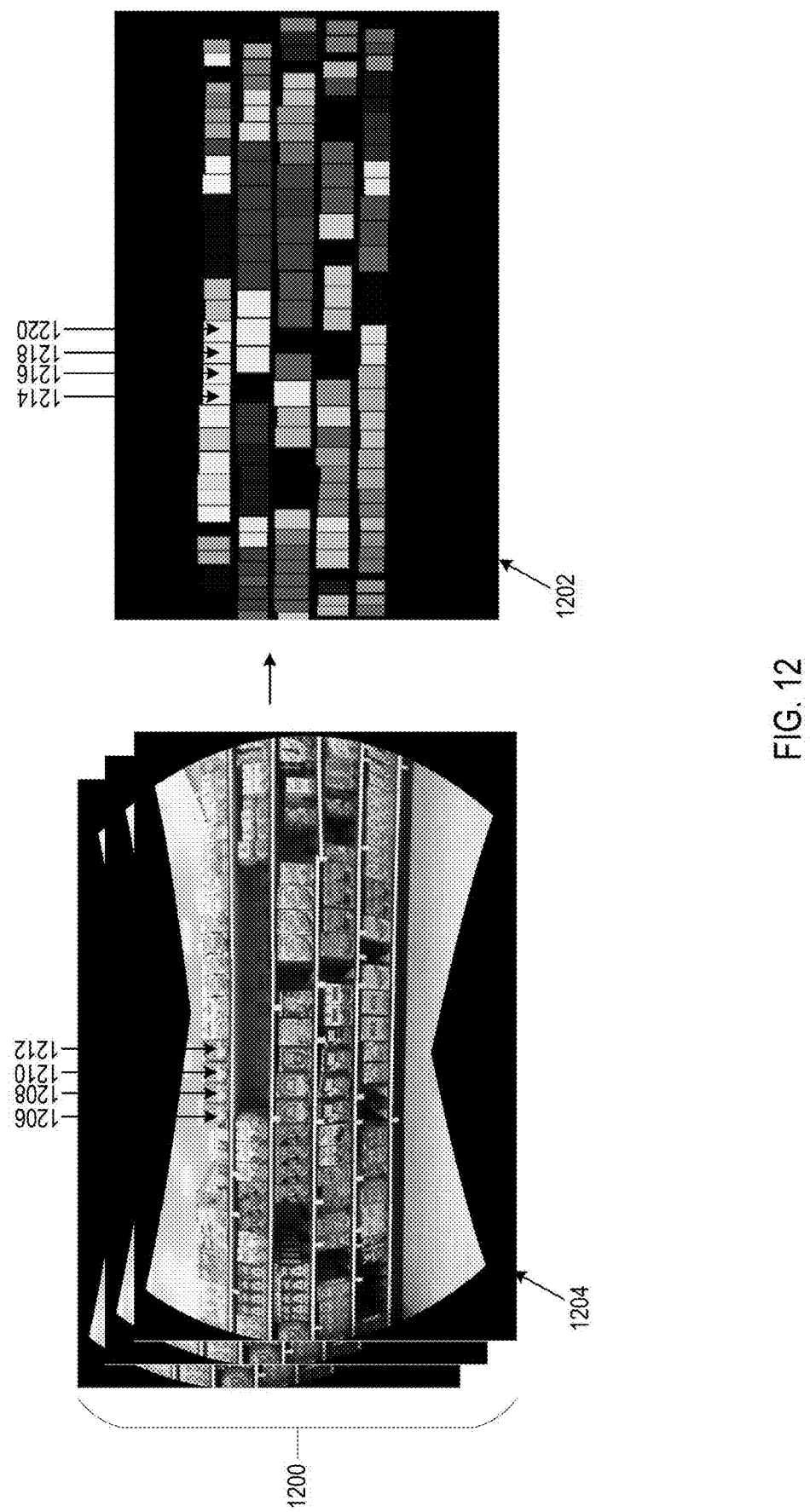
FIG. 12 illustrates an example background image that is generated from a plurality of pre-processed shelf images.

FIG. 12 illustrates an example background image that is generated from a plurality of pre-processed shelf images.

As described above in relation to FIG. 11, a plurality of pre-processed shelf images 1200 are used by the learning model 1106 of the background image generation sub-module 1104 to generate a background image 1204 that can be used as a reference in identifying foreground objects. For example, each of the plurality of pre-processed shelf images 1202 includes a stitched, de-warped, de-skewed image of the shelf across from the imaging devices 1002.

The pre-processed image 1202 may include one or more products that are arranged on the shelves to comply with a planogram. For example, the products 1206, 1208, 1210, 1212 depict boxes of Lucky Charms cereal that are placed at particular shelf locations within the top shelf.

The generated background image 1204 may include an image of the shelf, where each pixel of the image may be set based on the what the pixel represents. For example, a pixel corresponding to a particular product may be set to a value that corresponds to the item-identifier associated with the particular product. In another example, a pixel corresponding to a bounding box may be set to a bounding box value. The resulting background image 1204 may illustrate boundaries of bounding boxes represented with a common pixel value and boxes or rectangles that are enclosed within the boundaries of the bounding boxes with a common pixel value that corresponds to the item-identifier value. Other types of shapes for the boundaries of the bounding boxes are also possible.

The generated background image 1204 includes background image objects 1214, 1216, 1218, 1220 that correspond to the products 1206, 1208, 1210, 1212. The background image objects 1214, 1216, 1218, 1220 are represented as boxes with a common pixel value that corresponds to the item identifier value of Lucky Charms cereal. The pixels representing the boundaries of the bounding boxes is represented by a common pixel value that is unique such that each facing of the product is individually recognizable. As a result, although all the pixels associated with all four background image objects 1214, 1216, 1218, 1220 are all represented by the same item identifier value, each of the products is still distinguishable due to the dark boundaries enclosing the products.

Figure 13:
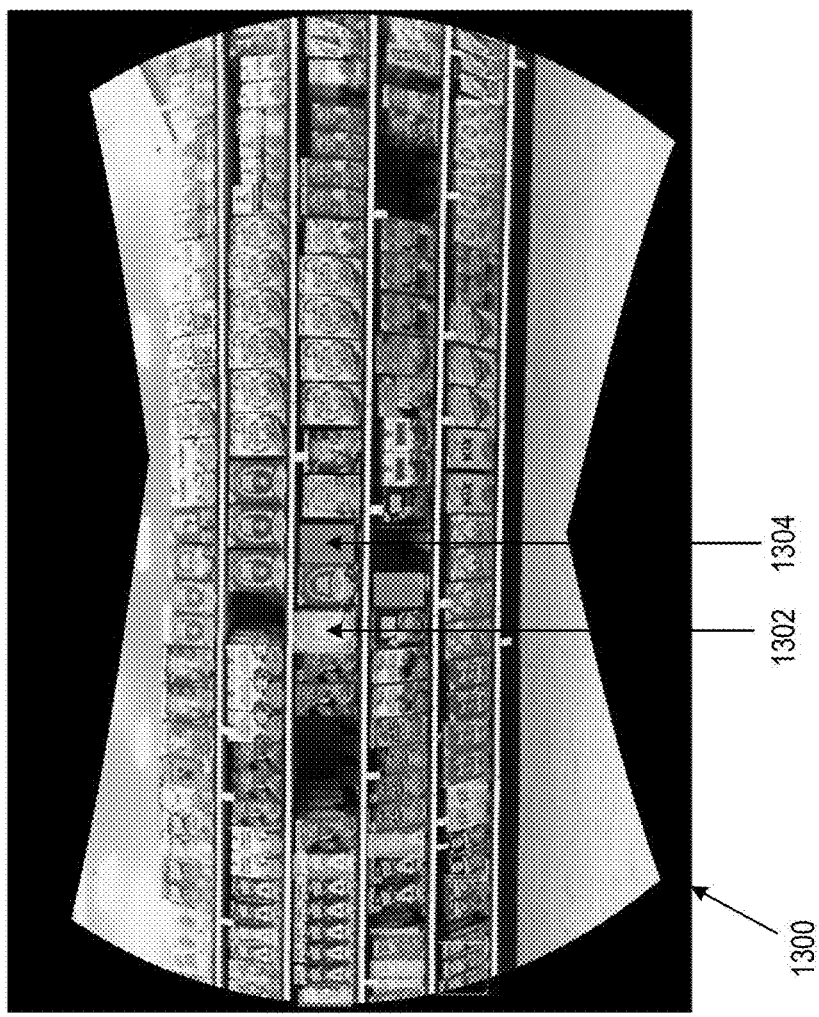
FIG. 13 illustrates example foreground objects identified within an example shelf image.

FIG. 13 illustrates example foreground objects identified within an example shelf image.

In some examples a background image may be used as a reference and a pre-processed shelf image 1300 may be compared against the background image 1202 in order to identify foreground objects within the pre-processed shelf image 1300. As described in relation to FIG. 11, the foreground object identification sub-module 1108 may compare the pre-processed shelf image 1300 to the background image 1202 in order to identify a plurality of foreground objects. In some examples, the identified foreground objects may be highlighted within the pre-processed shelf image by applying a colored box as a transparent overlay over the identified foreground object. In other examples, other ways of identifying the foreground objects is also possible.

In the present example, the plurality of identified foreground objects includes the foreground objects 1302, 1304. For example, the foreground object 1302 may be associated with a misplaced or mis-stocked product. In another example, the foreground object 1304 may be associated with a out-of-stock of missing product.

Figure 14:
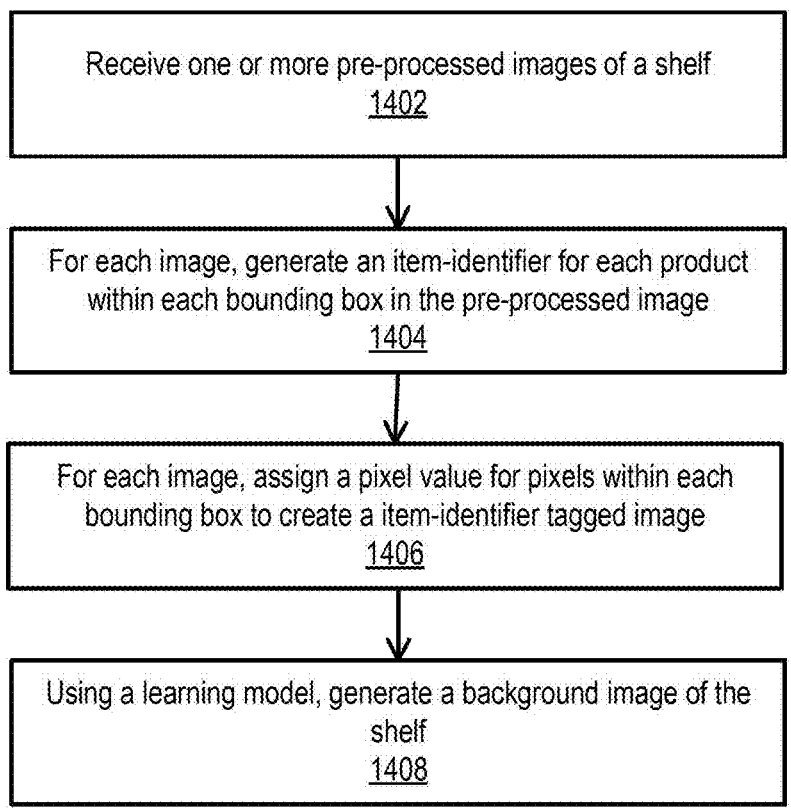
FIG. 14 illustrates an example method of generating a background image.

FIG. 14 illustrates an example method 1400 of generating a background image.

In example operation 1402, the item-identifier tagged image generation sub-module 1102 of the background modeling module 1014 receives one or more pre-processed images of a shelf from the stock availability module 1012. In another example, the item-identifier tagged image generation sub-module 1102 may retrieve the one or more of pre-processed images of a shelf from the datastore 1016.

The one or more pre-processed images of the shelf may be acquired using the imaging devices 1002 over time and processed by the stock availability module 1012 to include bounding boxes that enclose individual products within the shelf image. In some examples, pre-processing of the images includes stitching together different images of a shelf that captures different angles of the shelf so that the stitched shelf image depicts the entirety of the shelf. Pre-processing of the images also includes de-skewing and de-warping the stitched image.

In example operation 1404, for each product enclosed within a bounding box in each of the one or more of pre-processed shelf images, the item-identifier tagged image generation sub-module 1102 may identify and tag the product with an item-identifier associated with the image. The item-identifier may be a numeric or alpha-numeric code or another type of code that is associated with each product. A list of the item-identifiers and corresponding product related information such as product name, product description, product attributes such as height, weight and color may be stored in datastore 1016.

In some examples, the item-identifier tagged image generation sub-module 1102 may interface with the stock availability module 1012 to receive item-identifier information associated with some or all of the products within the pre-processed shelf image. In other examples, other types of image recognition models may be used to identify each individual product enclosed within the bounding boxes. In yet another example, human annotations may be used to identify each individual product enclosed within the bounding boxes.

In example operation 1406, for each of the one or more pre-processed shelf images, create an item-identifier tagged image by assigning a common pixel value for all pixels enclosed within each bounding box, wherein the common pixel value corresponds to the item-identifier that corresponds to the product enclosed within the bounding box and identified in example operation 1404. In some examples, the bounding box pixel values may also be set to a common bounding box pixel value that is unique and that does not overlap with any of the item-identifier values such that the bounding box is easily visually distinguishable.

In examples, the item-identifier tagged image generation sub-module 1102 may send the item-identifier tagged image to the datastore 1016 to be stored in the datastore 1016. Together, the item-identifier tagged images may later be used by the background image generation sub-module 1104 to generate a reference background image in operation 1410.

In example operation 1408, the background image generation sub-module 1104 may retrieve the one or more item-identifier tagged images from the datastore 1016. The background image generation sub-module 1104 may use learning model 1106 to analyze the one or more item-identifier tagged images in order extract background objects within the images from the foreground images. For example, the learning model 1106 may analyze the plurality of item-identifier tagged images from operation 1406 to identify common products that remain static in a shelf location over time.

In doing the analysis, the learning model 1106 may assign weights to different factors related to the item-identifier tagged images in order to arrive at the background objects within the images more quickly. For example, human annotated products within images are assigned higher weights than model annotated products within images. In another example, an image of a product within the shelf is assigned higher weights than images of the shelving unit.

In some examples, upon the learning module 1106 identifying the background objects within the item-identifier tagged image, the background image generation sub-module 1104 may generate a background image by creating an item-identifier tagged image that only includes the identified background objects while excluding any foreground objects. The generated background image is stored in the datastore 1016. The generated background image is periodically updated based on some or all of the new shelf images captured by the imaging devices 1002.

Figure 15:
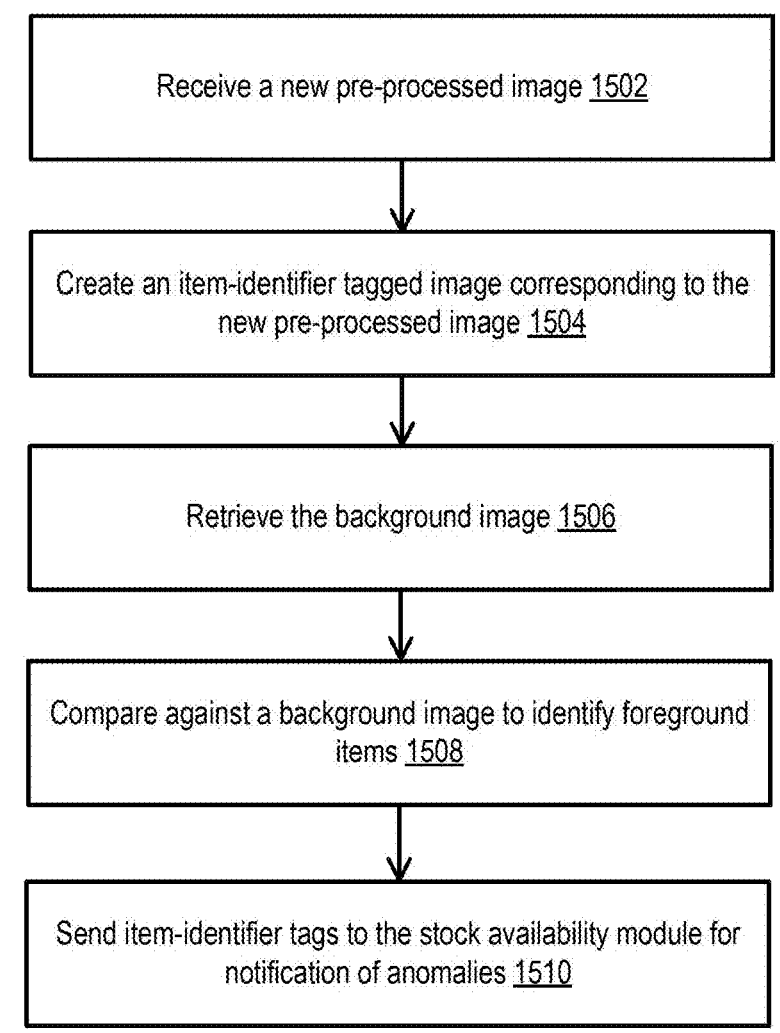
FIG. 15 illustrates an example method of identifying abnormalities within the shelf image and communicating the abnormalities to the employee user.

FIG. 15 illustrates an example method 1500 of identifying abnormalities within the shelf image and communicating the abnormalities to the employee user.

In example operation 1502, the item-identifier tagged image generation sub-module 1102 may receive a new pre-processed shelf image from the stock availability module 1012. In some examples, the item-identifier tagged image generation sub-module 1102 may retrieve the new pre-processed shelf image from the datastore 1016 instead. The new pre-processed shelf image includes a stitched, de-warped and de-skewed image of the shelf that was generated by the stock availability module 1012, as described in operations 504, 506 and 508 of FIG. 5.

In example operation 1504, the item-identifier tagged image generation sub-module 1102 may create an item-identifier tagged image of the shelf from the pre-processed shelf image that was received or retrieved by the item-identifier tagged image generation sub-module 1102 in operation 1502. The item-identifier tagged image is generated by the item-identifier tagged image generation sub-module 1102 from the pre-processed shelf image by generating an item-identifier for each product within each bounding box in the pre-processed image and assigning a common pixel value for the pixels within each bounding box in the pre-processed shelf image. The generation of item-identifiers and assignment of pixel values are similar to those described in operations 1404 and 1406 from FIG. 14.

In some examples, once created, the item-identifier tagged image is sent from the item-identifier tagged image generation sub-module 1102 to the foreground object identification sub-module 1108. In other examples, the item-identifier tagged image may be saved in the datastore 1016, where the image may later be retrieved by the foreground object identification sub-module 1108 during the foreground object identification process.

In example operation 1506, the foreground object identification sub-module 1108 retrieves the background image from the datastore 1016. The background image generated by the background image generation sub-module 1104 and described in further detail in relation to FIG. 14. The background image is a reference image that include only the background objects.

In example operation 1508, the foreground object identification sub-module 1108 may compare the item-identifier tagged image from operation 1504 to the background image from operation 1506 in order to identify foreground objects within the item-identifier tagged image. For example, foreground object identification sub-module 1108 may compare the item-identifier value associated with a bounding box from the item-identifier tagged image to the item-identifier value associated with a bounding box in a corresponding location within the background image in order to identify objects within the item-identifier tagged image that remain distinct from the objects within the background image.

For example, the bounding boxes within the item-identifier image and the background image can be easily identified because the pixels associated with a bounding box are set to a unique bounding box pixel value by the item-identifier tagged image generation sub-module 1102. Once the bounding boxes of the item-identifier tagged image and the bounding boxes of the background image are identified, the two images may be aligned such that the bounding boxes may overlap and the pixel values, which correspond to item-identifier values, within the bounding boxes may be compared to identify any discrepancies. For example, when the pixel value or item-identifier value between corresponding locations within the item-identifier tagged image and the background image does not match, the pixels within the bounding box corresponding to the particular location within the item-identifier tagged image may be identified as a foreground object.

In example operation 1510, the foreground object identification sub-module 1108 may send the item-identifier tags associated with each of the identified foreground objects to the stock availability module 1012. The stock availability module 1012 may receive the item-identifier tags from the foreground object identification sub-module 1108 and send out an alert to the employee user that anomalies related to the products associated with the received item identifier tags were identified.

Although various embodiments are described herein, those of ordinary skill in the art will understand that many modifications may be made thereto within the scope of the present disclosure. Accordingly, it is not intended that the scope of the disclosure in any way be limited by the examples provided.

As described above in relation to FIGS. 10-15, the background modeling algorithm uses of a continuously learning model that adapts to a changing environment to distinguish between foreground image components and background image components in order to identify anomalies within a shelf image. For example, the background modeling algorithm may use a learning model to generate background image that only includes generally static components within the shelf image that do not change over time. The static components within the shelf image may relate to shelf objects that are located at their expected locations. In other words, static components, which may include labels, banners, and products, within a shelf image may include objects that are placed in a location within the shelf that matches the pre-determined location associated with the object itself. Any object that does not remain static may be regarded as a foreground object. Foreground image components, which may change over time, may relate to shelf anomalies, for example, missing products or wrongly placed products. In other words, foreground objects, which may include shopping carts, customers, mis-shelved products, and empty shelf spaces, may include any object that is out of place.

The background modeling module 1014 is simply one example algorithm to detect anomalies within a shelf image that uses a learning model to learn the placement of products within a shelf without requiring a reference planogram to detect the anomalies within the shelf. The background modeling algorithm may interface with the stock availability module 112, described in detail in relation to FIGS. 1-6 to generate pre-processed shelf images, detect individual products within the shelf image and to send out notifications to users regarding the detected shelf anomalies.

The product fingerprinting module 114, described in detail in relation to FIG. 7-9, is an alternate algorithm that can be used to detect anomalies within a shelf image. The product fingerprinting module 114 may determine anomalies within the shelf image by generating a product fingerprint for all detected products within the shelf and comparing the fingerprints to a database of product fingerprints in order to detect out-of-stock or mis-shelved products within the shelf. For example, the product fingerprinting algorithm may also interface with the stock availability module to generate pre-processed shelf images, detect individual products within the shelf image and to send out notifications to users regarding the detected shelf anomalies.

Thus, the product fingerprinting module 114 and the background modeling module 1014 may provide alternate methods for detecting anomalies within a shelf image.

Figure 16:
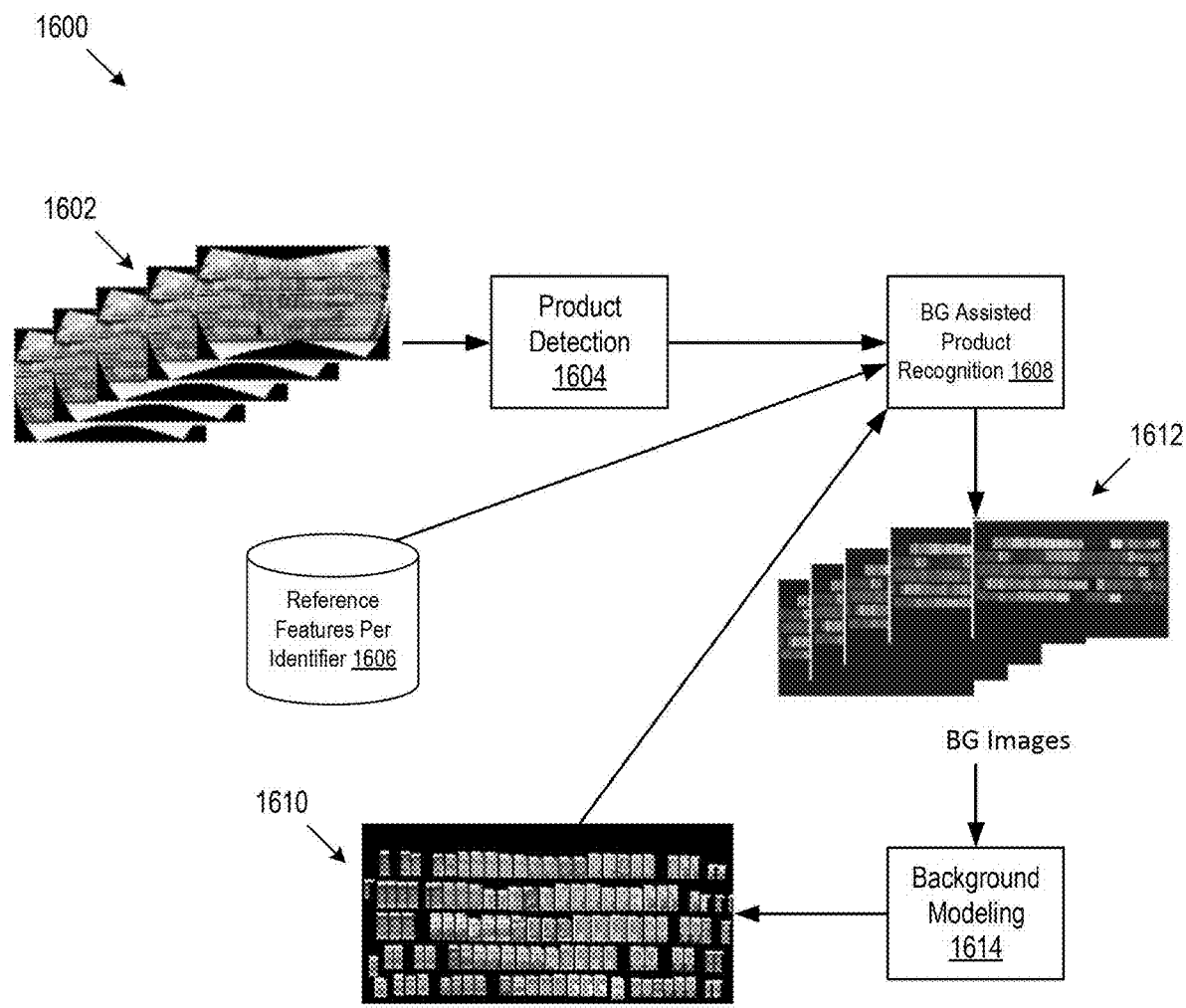
FIG. 16 illustrates an example process diagram for performing background modeling assisted item recognition in an example shelf image.

Referring now to FIG. 16, an example process diagram 1600 is shown for performing background modeling assisted item recognition in an example shelf image. The example process diagram 1600 illustrates an overall structure in which background modeling may be used, in combination with a set of initial, annotated shelf images, to automatically identify items within, and automatically annotate, subsequent shelf images at other shelves having different planogram layouts or item locations.

In the example shown, a set of shelf images 1602 may be provided to a product detection subsystem 1604. The product detection subsystem 1604 may automatically identify individual items within the shelf image 1602, for example identifying a range of pixels associated with an individual item, as described above.

A background modeling assisted product recognition subsystem 1606 will receive the shelf images and associated identified item image regions as noted by the product detection subsystem 1604, and utilize (1) a set of reference features in a reference database 1608, and (2) a background modeling-assisted planogram 1610, to identify specific items in the item image regions. Specifically, the reference database 1608 stores a set of numerical features derived from product images, in association with an item-identifier. Additionally, in the background modeling-assisted planogram 1610, individual items are associated with a particular location within the planogram image, as well as a particular item-identifier.

In example embodiments, the reference database 1608 stores a set of reference features per item identifier with each item that has previously been recognized. At an initial stage, a correlation between item identifier and item that is detected by the product detection subsystem 1604 may be based on hand-annotation, or semi-supervised learning. Subsequently, a matching process may be performed between the identified items in the shelf image and the identified images in regions of a background modeling-assisted planogram 1610 to identify item similarity between the "planogram" item image that is derived from the background image in the region where the item is located, and the item image region from the shelf image.

Additionally, in example embodiments, the background modeling assisted product recognition subsystem 1606 will process the shelf images 1602 to generate background images 1612, analogously to generation of background images 1204 as discussed above. That is, background images 1612 are generated that represent an extent of change from a background image to identify locations within the image that have changed, relative to static (background) regions, The combination of the background images 1612 with the shelf images (as processed by the product detection subsystem 1604) are then used by the background modeling subsystem 1614 which identifies positions of background and foreground objects in the current shelf edge image. That is, the background modeling subsystem 1614 will identify, among the background images, those regions that correspond to identified item image regions, by comparison of the identified items in the shelf edge images to the background modeled images. In particular, because foreground images may correspond to the absence of an item (due to a change in the image), "background" regions are identified that correspond to item image regions, such that the item image regions that are "background" being identified as representing the item, whereas "foreground" regions that correspond to item image regions are not identified as representing the item due to changes (e.g., representing an item relocation or out of stock event).

Based on identification and correlation of the "background" regions corresponding to the item regions in the shelf image, the background modeled planogram 1610 may be generated by selecting individual item regions from the shelf image and positioning the individual item regions spatially within a representative image that places image regions from shelf images that correspond to both an identified item and a background region of the background image 1612.

Once the background modeled planogram 1610 is generated, such a planogram image may be used in combination with data from the reference database 1608 by the background modeling assisted product recognition subsystem 1606, in a process performed on subsequent shelf-edge images. Accordingly, for a given shelf location, even if an item changes in shelf position, the background modeled planogram 1610 may be useable to identify the same image region in a different location, and the background modeled planogram 1610 may be updated accordingly. Furthermore, as items are rearranged, or as new items are added to a shelf, only those new items may need to be hand annotated or otherwise independently identified, with existing items able to be automatically identified in such subsequent images.

Accordingly, use of background modeling may assist with accurate generation of a shelf planogram, and the shelf planogram may subsequently be useable to assist with accurate item recognition within the background modeling process, thereby reducing the need for user intervention for purposes of image annotation.

What is claimed is:

1. A method for identifying anomalies within a shelf, the method comprising:
   receiving, by a processor, one or more images of the shelf from one or more imaging devices;
   generating, by the processor, an item-identifier tagged image from the one or more images, wherein the item-identifier tagged image is generated by:
      stitching together the one or more images to create a single shelf image, wherein the single shelf image includes a plurality of shelf products;
      generating a bounding box to enclose each of the plurality of shelf products;
      determining an item identifier that identifies each of the plurality of shelf products on the single shelf image; and
      assigning a common pixel value to all pixels within each bounding box associated with each of the plurality of shelf products to generate the item-identifier tagged image, wherein the common pixel value for each bounding box corresponds to the item-identifier associated with the shelf product enclosed within the bounding box;

retrieving a reference background image from a data store;

comparing the item-identifier tagged image to the reference background image; based on the comparison, identifying foreground objects within the item-identifier tagged image;

determining that the identified foreground objects correspond to anomalies associated with the shelf; and sending an item-identifier tag associated with each of the identified foreground objects to a user electronic computing device as a notification of anomalies within the shelf.

2. The method of claim 1, further comprising:

generating one or more pre-processed reference images of the shelf, wherein each of the one or more pre-processed images includes a plurality of products;

generating an item-identifier tagged reference image corresponding to each of the one or more pre-processed reference images;

generating the reference background image from the one or more pre-processed reference images; and storing the reference background image in the data store.

3. The method of claim 2, wherein generating the one or more pre-processed reference images includes:

for each pre-processed reference image of the one or more pre-processed reference images:

receiving one or more reference images of the shelf from one or more imaging devices;

pre-processing the one or reference images, wherein pre-processing the one or more reference images includes:

stitching together the one or more reference image to create a single reference image;

detecting the plurality of products within the single reference image; and adding a reference bounding box that surrounds each of the plurality of products on the single reference image to create the pre-processed reference image.

4. The method of claim 3, wherein generating the item-identifier tagged reference image corresponding to each of the one or more pre-processed reference images includes:

for each pre-processed reference image of the one or more pre-processed reference images:

identifying each of the plurality of products within the pre-processed reference image;

associating an item-identifier tag with each of the plurality of products within the pre-processed reference image;

assigning a reference common pixel value to all pixels within each reference bounding box associated with each of the plurality of products to create the item-identifier tagged reference image, wherein the reference common pixel value for each reference bounding box corresponds to the item-identifier tag associated with the product enclosed within the reference bounding box.

5. The method of claim 4, wherein identifying each of the plurality of products within the pre-processed reference image and associating an item-identifier tag with each of the plurality of products within the pre-processed reference image is performed using user annotation.

6. The method of claim 4, wherein the item-identifier tag is a numeric or alphanumeric code used to identify each of the one or more products.

7. The method of claim 2, wherein generating the reference background image includes:

using a learning model, evaluating the item-identifier tagged reference image corresponding to each of the one or more pre-processed reference images to identify background objects within the item-identifier tagged reference images, wherein the background objects are objects that remain static among the item-identifier tagged reference images; and generating a common item-identifier tagged reference image that only includes the identified background objects.

8. The method of claim 1, wherein comparing the item-identifier tagged image to the reference background image includes: for each shelf product included within the item-identifier tagged image, determining whether an item-identifier tag corresponding with the shelf product matches an item identifier tag associated with a product from a corresponding location within the reference background image.

9. The method of claim 8, wherein identifying the foreground objects includes identifying any item-identifier tag from the item-identifier tagged image that does not match a corresponding item-identifier tag from the reference background image.

10. A system for identifying anomalies within a shelf, the system comprising:

one or more imaging devices; and a computing system comprising:

a processor;

a memory communicatively connected to the processor which stores program instructions executable by the processor, wherein, when executed the program instructions cause the system to:

receive one or more images of the shelf from one or more imaging devices;

generate an item-identifier tagged image from the one or more images, wherein the item-identifier tagged image is generated by:

stitching together the one or more images to create a single shelf image, wherein the single shelf image includes a plurality of shelf products;

generating a bounding box to enclose each of the plurality of shelf products;

determining an item identifier that identifies each of the plurality of shelf products on the single shelf image; and assigning a common pixel value to all pixels within each bounding box associated with each of the plurality of shelf products to generate the item-identifier tagged image, wherein the common pixel value for each bounding box corresponds to the item-identifier associated with the shelf product enclosed within the bounding box;

retrieve a reference background image from a data store;

compare the item-identifier tagged image to the reference background image;

based on the comparison, identify foreground objects within the item-identifier tagged image;

determine that the identified foreground objects correspond to anomalies associated with the shelf, wherein the anomalies include at least one of: a product that is mis-shelved and a shelf product that is out-of-stock; and send an item-identifier tag associated with each of the identified foreground objects to a user electronic computing device as a notification of anomalies within the shelf.

11. The system of claim 10, wherein when executed, the program instructions further cause the system to:

generate one or more pre-processed reference images of the shelf, wherein each of the one or more pre-processed images includes a plurality of products;

generate an item-identifier tagged reference image corresponding to each of the one or more pre-processed reference images;

generate the reference background image from the one or more pre-processed reference images; and store the reference background image in the data store.

12. The system of claim 11, wherein generate the one or more pre-processed reference images includes:

for each pre-processed reference image of the one or more pre-processed reference images:

receive one or more reference images of the shelf from one or more imaging devices;

pre-process the one or reference images, wherein pre-processing the one or more reference images includes:

stitch together the one or more reference image to create a single reference image;

detect the plurality of products within the single reference image; and add a reference bounding box that surrounds each of the plurality of products on the single reference image to create the pre-processed reference image.

13. The system of claim 11, wherein generate an item-identifier tagged reference image corresponding to each of the one or more pre-processed reference images includes:

for each pre-processed reference image of the one or more pre-processed reference images:

identify each of the plurality of products within the pre-processed reference image;

associate an item-identifier tag with each of the plurality of products within the pre-processed reference image;

assign a reference common pixel value to all pixels within each reference bounding box associated with each of the plurality of products to create the item-identifier tagged reference image, wherein the reference common pixel value for each bounding box corresponds to the item-identifier tag associated with the product enclosed within the reference bounding box.

14. The system of claim 13, wherein identify each of the plurality of products within the pre-processed reference image is performed using user annotation.

15. The system of claim 11, wherein generate the reference background image includes:

using a learning model, evaluate the item-identifier tagged reference image corresponding to each of the one or more pre-processed reference images to identify background objects within the item-identifier tagged reference images, wherein the background objects are objects that remain static among the item-identifier tagged reference images; and generate a common item-identifier tagged reference image that only includes the identified background objects.

16. The system of claim 10, wherein compare the item-identifier tagged image to the reference background image includes: for each shelf product included within the item-identifier tagged image, determine whether an item-identifier tag corresponding with the shelf product matches an item identifier tag associated with a product from a corresponding location within the reference background image.

17. The system of claim 16, wherein identify the foreground objects includes to identify any item-identifier tag from the item-identifier tagged image that does not match a corresponding item-identifier tag from the reference background image.

18. A method for identifying anomalies within a shelf, the method comprising:

receiving, by a processor, one or more images of the shelf from one or more imaging devices;

stitching, by the processor, together the one or more images to create a single shelf image;

detecting, by the processor, a plurality of shelf products within the single shelf image;

adding, by the processor, a bounding box that surrounds each of the plurality of shelf products on the single shelf image;

identifying, by the processor, each of the plurality of shelf products within the single shelf image;

associating, by the processor, an item-identifier tag with each of the plurality of shelf products within the single shelf image;

assigning, by the processor, a common pixel value to all pixels within each bounding box associated with each of the plurality of shelf products to create an item-identifier tagged image, wherein the common pixel value for each bounding box corresponds to the item-identifier tag associated with the shelf product enclosed within the bounding box;

retrieving, by the processor, a reference background image from a data store, wherein the reference background image includes item-identifier tags corresponding to expected products associated with each product location on the shelf;

comparing, by the processor, the item-identifier tagged image to the reference background image, including:

for each shelf product included within the item-identifier tagged image, determining whether an item-identifier tag corresponding with the shelf product matches an item identifier tag associated with a product from a corresponding location within the reference background image;

based on the comparison, identifying, by the processor, foreground objects within the item-identifier tagged image;

determining, by the processor, that the identified foreground objects correspond to anomalies associated with the shelf; and sending, by the processor, an item-identifier tag associated with each of the identified foreground objects to a user electronic computing device as a notification of anomalies within the shelf.

* * * * *